United States Patent … US 10,267,621 B2
Kuga et al. … Date of Patent: Apr. 23, 2019

(54) CONFOCAL DISPLACEMENT SENSOR

(71) Applicant: Keyence Corporation, Osaka (JP)

(72) Inventors: Shoma Kuga, Osaka (JP); Suketaka Fujimoto, Osaka (JP); Hideto Takei, Osaka (JP); Yusuke Suemura, Osaka (JP); Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/981,925

(22) Filed: May 17, 2018

(65) Prior Publication Data

US 2018/0356208 A1 Dec. 13, 2018

(30) Foreign Application Priority Data

Jun. 13, 2017 (JP) ................................. 2017-115552

(51) Int. Cl.
- *G01B 11/14* (2006.01)
- *G01B 11/02* (2006.01)
- *G02B 21/00* (2006.01)
- *G01B 9/02* (2006.01)

(52) U.S. Cl.
CPC ........ *G01B 11/026* (2013.01); *G01B 9/02044* (2013.01); *G02B 21/0064* (2013.01); *G02B 21/0076* (2013.01); *G01B 2210/50* (2013.01)

(58) Field of Classification Search
CPC ...... G01B 11/026; G01J 3/0208; G01J 3/0218
USPC ....................................................... 356/614
See application file for complete search history.

(56) References Cited

U.S. PATENT DOCUMENTS

| 5,737,084 A | * | 4/1998 | Ishihara | ............... | G01B 11/026 |
| | | | | | 356/609 |
| 5,785,651 A | * | 7/1998 | Kuhn | ................... | G01B 11/026 |
| | | | | | 250/339.06 |
| 8,427,644 B2 | * | 4/2013 | Miki | ..................... | G01B 11/026 |
| | | | | | 356/364 |
| 8,773,757 B2 | * | 7/2014 | Chen | .................. | G02B 21/0032 |
| | | | | | 359/368 |

(Continued)

OTHER PUBLICATIONS

U.S. Appl. No. 15/981,924, filed May 17, 2018 (63 pages).

(Continued)

*Primary Examiner* — Roy M Punnoose
(74) *Attorney, Agent, or Firm* — Kilyk & Bowersox, P.L.L.C.

(57) ABSTRACT

The confocal displacement sensor includes a light source for light projection configured to generate light having a plurality of wavelengths, a plurality of pinholes, an optical member configured to cause an axial chromatic aberration in the plurality of detection lights respectively emitted via the plurality of pinholes and converge the plurality of detection lights toward the measurement object, a spectroscope configured to respectively spectrally disperse, in the detection lights irradiated on the measurement object via the optical member, a plurality of detection lights respectively passed through the plurality of pinholes by being reflected while focusing on the measurement object and generate a plurality of light reception waveforms representing light reception intensities for each wavelength, and a measurement control section configured to statistically process the plurality of light reception waveforms and generate a representative light reception waveform from the plurality of light reception waveforms.

20 Claims, 17 Drawing Sheets

(56) References Cited

U.S. PATENT DOCUMENTS

| | | | | |
|---|---|---|---|---|
| 9,541,376 B2* | 1/2017 | Kubo | ............... | G02B 21/0064 |
| 2006/0109483 A1* | 5/2006 | Marx | ............... | G01B 11/0608 |
| | | | | 356/609 |
| 2010/0208486 A1* | 8/2010 | Gladnick | ............ | G01B 11/026 |
| | | | | 362/551 |
| 2011/0013186 A1* | 1/2011 | Miki | ................ | G01B 11/026 |
| | | | | 356/364 |
| 2012/0019821 A1* | 1/2012 | Chen | ............... | G02B 21/0032 |
| | | | | 356/303 |
| 2014/0236022 A1* | 8/2014 | Zeng | ............... | A61B 1/00172 |
| | | | | 600/476 |
| 2015/0185454 A1* | 7/2015 | Kalkbrenner | ...... | G02B 21/0032 |
| | | | | 250/550 |
| 2016/0249812 A1* | 9/2016 | Wang | ............... | A61B 5/0059 |
| | | | | 600/407 |

OTHER PUBLICATIONS

U.S. Appl. No. 15/981,927, filed May 17, 2018 (51 pages).
U.S. Appl. No. 15/989,215, filed May 25, 2018 (162 pages).
U.S. Appl. No. 15/989,216, filed May 25, 2018 (147 pages).

* cited by examiner

CONFOCAL DISPLACEMENT SENSOR

CROSS-REFERENCE TO RELATED APPLICATIONS

The present application claims foreign priority based on Japanese Patent Application No. 2017-115552, filed Jun. 13, 2017, the contents of which is incorporated herein by reference.

BACKGROUND OF THE INVENTION

1. Field of the Invention

The present invention relates to a confocal displacement sensor and, more particularly, to improvement of a confocal displacement sensor that measures displacement of a measurement object using a confocal optical system.

2. Description of Related Art

A confocal displacement sensor is an optical measurement device that measures displacement of a measurement object making use of a confocal principle of stopping down received light into reflected light from an image forming surface on which an image of a light source is formed and a phenomenon of an axial chromatic aberration in which a color drift in an optical axis direction occurs in the image of the light source.

The confocal displacement sensor is configured by a pinhole that emits, as a point light source, light emitted from a light source, an optical member that causes an axial chromatic aberration in detection light emitted via the pinhole and converges the detection light toward the measurement object, and a spectroscope that spectrally disperses reflected light from the measurement object. As the detection light, light having a plurality of wavelengths, for example, white light is used. The pinhole allows, in the detection light irradiated on the measurement object via the optical member, detection light having a wavelength reflected while focusing on the measurement object to pass.

The position of the image forming surface is different for each wavelength according to the axial chromatic aberration. Therefore, displacement of the measurement object is calculated by specifying a wavelength of the detection light passed through the pinhole. The displacement is the distance in the optical axis direction from a predetermined reference position to the measurement object. The depth or the height of unevenness on a surface, the thickness of a transparent body, and the like can be measured by calculating the displacement.

When a rough surface body that irregularly reflects light with fine unevenness of the surface thereof is used as the measurement object, detection light focused on the surface is reflected in random directions. Therefore, an intensity level after spectral dispersion decreases and an error increases. In particular, a measurement value sometimes greatly fluctuates exceeding a degree of surface roughness depending on a measurement part. Therefore, for example, accuracy is low when displacements are respectively measured in a plurality of measurement parts using a plurality of displacement gauges and flatness of the measurement object is calculated from measurement values.

When the position of a displacement gauge slightly deviates, a measurement value greatly fluctuates because of the influence of irregular reflection. Therefore, the measurement value is unstable depending on a setting state of the displacement gauge.

SUMMARY OF THE INVENTION

The present invention has been devised in view of the circumstances, and an object of the present invention is to provide a confocal displacement sensor that can improve measurement accuracy for a measurement object that irregularly reflects light. In particular, an object of the present invention is to provide a confocal displacement sensor that can prevent a measurement value from fluctuating exceeding a degree of surface roughness of a rough surface body. Further, an object of the present invention is to provide a confocal displacement sensor that can prevent fluctuation in a measurement value with respect to positional deviation of a displacement gauge.

A confocal displacement sensor according to a first aspect of the present invention is a confocal displacement sensor that measures displacement of a measurement object using a confocal optical system. The confocal displacement sensor includes: a light source for light projection configured to generate light having a plurality of wavelengths; a plurality of pinholes configured to respectively emit a plurality of detection lights by allowing light emitted from the light source for light projection to pass; an optical member configured to cause an axial chromatic aberration in the plurality of detection lights respectively emitted via the plurality of pinholes and converge the plurality of detection lights toward the measurement object; a spectroscope configured to respectively spectrally disperse, in the detection lights irradiated on the measurement object via the optical member, a plurality of detection lights respectively passed through the plurality of pinholes by being reflected while focusing on the measurement object and generate a plurality of light reception waveforms representing light reception intensities for each wavelength; and a measurement control section configured to statistically process the plurality of light reception waveforms and generate a representative light reception waveform from the plurality of light reception waveforms.

In the confocal displacement sensor, a plurality of irradiation spots are formed on the measurement object to correspond to the plurality of pinholes. By statistically processing a plurality of light reception waveforms corresponding to the irradiation spots to generate a representative light reception waveform and calculating displacement, it is possible to prevent the influence of irregular reflection due to local unevenness of the surface of the measurement object. Therefore, it is possible to prevent a measurement value from greatly fluctuating depending on a measurement part. In particular, it is possible to prevent the measurement value from fluctuating exceeding a degree of surface roughness of a rough surface body. Further, it is possible to prevent fluctuation in the measurement value with respect to positional deviation of the confocal displacement sensor.

A confocal displacement sensor according to a second aspect of the present invention is a confocal displacement sensor that measures displacement of a measurement object using a confocal optical system. The confocal displacement sensor includes: a light source for light projection configured to generate light having a plurality of wavelengths; a plurality of pinholes configured to respectively emit a plurality of detection lights by allowing light emitted from the light source for light projection to pass; an optical member configured to cause an axial chromatic aberration in the plurality of detection lights respectively emitted via the plurality of pinholes and converge the plurality of detection lights toward the measurement object; a spectroscope configured to respectively spectrally disperse, in the detection lights irradiated on the measurement object via the optical member, a plurality of detection lights respectively passed through the plurality of pinholes by being reflected while focusing on the measurement object and generate a plurality of light reception waveforms representing light reception intensities for each wavelength; and a measurement control section configured to respectively calculate displacements of the measurement object on the basis of the plurality of light reception waveforms, statistically process the displacements, and generate representative displacement.

In the confocal displacement sensor, a plurality of irradiation spots are formed on the measurement object to correspond to the plurality of pinholes. By respectively calculating displacements of the measurement object from a plurality of light reception waveforms corresponding to the irradiation spots and statistically processing the displacements to generate representative displacement, it is possible to prevent the influence of irregular reflection due to local unevenness of the surface of the measurement object.

In a third aspect of the present invention, in addition to the configuration explained above, in the confocal displacement sensor, the measurement control section may respectively specify peak positions concerning the plurality of light reception waveforms.

With such a configuration, since peak positions are respectively specified concerning the plurality of irradiation spots, it is possible to further improve the measurement accuracy by excluding an outlier from the peak positions or performing statistical processing for, for example, weighting the peak positions according to light reception waveforms corresponding to the peak positions.

In a fourth aspect of the present invention, in addition to the configuration explained above, in the confocal displacement sensor, the measurement control section may specify a search range on the basis of an integrated waveform obtained by superimposing the plurality of light reception waveforms and fit, concerning the plurality of light reception waveforms, a curve in a data point row in the search range for each of the light reception waveforms to specify the peak position.

With such a configuration, the data point row is narrowed down to the search range specified using the integrated waveform and the curve is fit in the data point row. Therefore, it is possible to prevent fluctuation in a measurement value due to noise.

In a fifth aspect of the present invention, in addition to the configuration explained above, the confocal displacement sensor may further include a correction-information storing section configured to retain correction information for correcting linearity in converting the peak position into displacement. The spectroscope may include a plurality of image sensors corresponding to the plurality of pinholes. The image sensors may receive detection lights after spectral dispersion and generate the light reception waveforms. The measurement control section may perform the correction of the linearity for each of the image sensors using the correction information to calculate displacement.

With such a configuration, since the linearity is corrected for each of the image sensors, it is possible to further improve the measurement accuracy. For example, when the reflectance of the surface is greatly different depending on a measurement part, it is possible to prevent the measurement accuracy from being deteriorated by the influence of an irradiation spot having high reflectance.

In a sixth aspect of the present invention, in addition to the configuration explained above, the confocal displacement sensor may further include a base-waveform storing section configured to retain a base waveform corresponding to detection light not emitted from the optical member. The spectroscope may include a plurality of image sensors corresponding to the plurality of pinholes. The image sensors may receive detection lights after spectral dispersion and generate the light reception waveforms. The measurement control section may extract a signal waveform from the light reception waveforms for each of the image sensors on the basis of the base waveform and specify the peak position. With such a configuration, it is possible to correctly specify the peak position without being affected by return light reflected by a member other than the measurement object.

In a seventh aspect of the present invention, in addition to the configuration explained above, in the confocal displacement sensor, the spectroscope may include a plurality of image sensors corresponding to the plurality of pinholes. The image sensors may receive detection lights after spectral dispersion and generate the light reception waveforms. The measurement control section may calculate displacement of the measurement object on the basis of a plurality of light reception waveforms acquired by differentiating an exposure amount for each of the image sensors.

With such a configuration, even if there is an irradiation spot having excessive exposure or insufficient exposure, displacement is calculated from light reception waveforms corresponding to the other irradiation spots. Therefore, it is possible to obtain a wide dynamic range.

In an eighth aspect of the present invention, in addition to the configuration explained above, the confocal displacement sensor may further include an optical combination section configured to optically combine a part of a plurality of detection lights respectively passed through the plurality of pinholes and generate a plurality of combined lights. The spectroscope may respectively spectrally disperse the plurality of combined lights and generate a plurality of light reception waveforms. With such a configuration, it is possible to simplify the configuration of the spectroscope.

A confocal displacement sensor according to a ninth aspect of the present invention is a confocal displacement sensor including: a head unit including a confocal optical system; a control device including a light source for light projection configured to generate light having a plurality of wavelengths; and a fiber cable including a plurality of optical fibers configured to respectively transmit light emitted from the light source for light projection to the head unit. The head unit includes an optical member configured to cause an axial chromatic aberration in a plurality of detection lights respectively emitted via end faces of the plurality of optical fibers and converge the plurality of detection lights toward a measurement object. The control device includes: a spectroscope configured to respectively spectrally disperse, in the detection lights irradiated on the measurement object via the optical member, a plurality of detection lights respectively passed through the end faces of the plurality of optical fibers by being reflected while focusing on the measurement object and generate a plurality of light reception waveforms representing light reception intensities for each wavelength; and a measurement control section configured to calculate displacement of the measurement object on the basis of the plurality of light reception waveforms.

In the confocal displacement sensor, it is possible to cause the end faces of the plurality of optical fibers, which transmit lights between the head unit and the control device, to respectively function as pinholes of the confocal optical system. It is possible to prevent the influence of irregular reflection due to local unevenness of the surface of the measurement object. Therefore, it is possible to prevent a measurement value from greatly fluctuating depending on the position of the head unit.

According to the present invention, it is possible to prevent the influence of irregular reflection due to local unevenness of the surface of a measurement object. Therefore, it is possible to improve measurement accuracy for the measurement object that irregularly reflects light. In particular, it is possible to prevent a measurement value from fluctuating exceeding a degree of surface roughness of a rough surface body. Further, it is possible to prevent fluctuation in a measurement value with respect to positional deviation of a displacement gauge.

DESCRIPTION OF EMBODIMENTS

An embodiment of the present invention is explained below with reference to the drawings. In this specification, for convenience, a direction of an optical axis of a head unit is explained as an up-down direction. However, a posture and a direction during use of the head unit are not limited.
First Embodiment
Confocal Displacement Sensor 1

Figure 1:
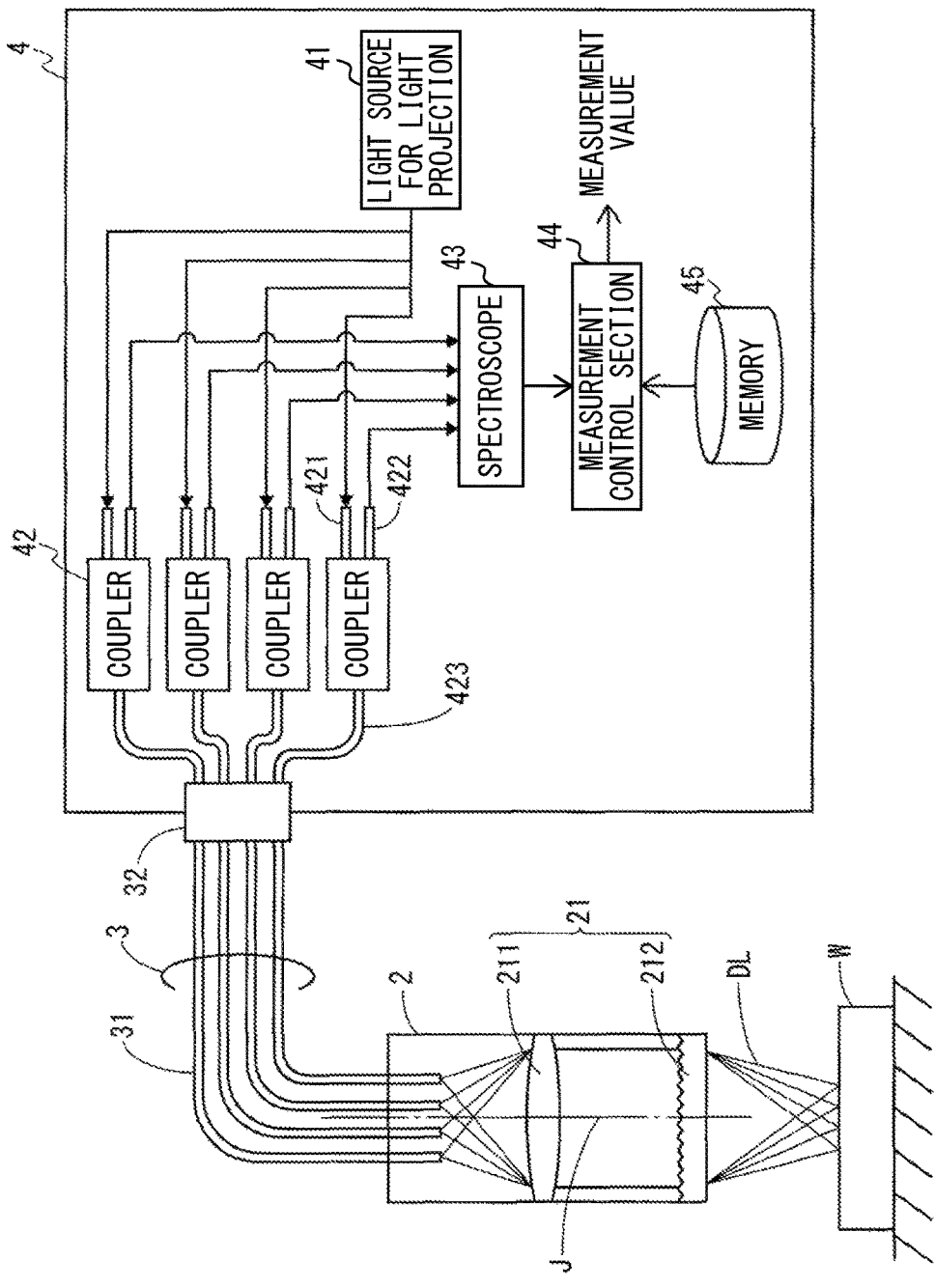
FIG. 1 is a system diagram showing a configuration example of a confocal displacement sensor according to a first embodiment of the present invention.

FIG. 1 is a system diagram showing a configuration example of a confocal displacement sensor 1 according to a first embodiment of the present invention. The confocal displacement sensor 1 is an optical measurement device configured by a head unit 2, a fiber cable 3, and a control device 4. The optical measurement device respectively receives reflected lights from a measurement object W when a plurality of detection lights DL are emitted from the head unit 2 and measures displacement of the measurement object W.

The head unit 2 and the control device 4 are connected to each other via the fiber cable 3. The fiber cable 3 includes a plurality of optical fibers 31 that respectively transmit a plurality of lights. A connector 32 is provided at one ends of the fiber cables 3. The connector 32 is detachably connected to the control device 4.

The head unit 2 is an optical unit that emits the detection lights DL toward the measurement object W. Reflected light from the measurement object W is made incident on the optical unit. The head unit 2 includes an optical member 21 including a refraction lens 211 and a diffraction lens 212. The optical member 21 causes an axial chromatic aberration in the plurality of detection lights DL respectively emitted from end faces of the plurality of optical fibers 31 and converges the plurality of detection lights DL toward the measurement object W. The axial chromatic aberration is a color drift of an image in an optical axis direction due to dispersion.

In the confocal displacement sensor 1, the lights are respectively transmitted to the head unit 2 via four optical fibers 31. Four irradiation spots are formed on the measurement object W by four detection lights DL emitted from the head unit 2. Emission end faces of the optical fibers 31 function as pinholes that allow light emitted from a light source for light projection to pass to be a point light source that emits the detection lights DL. The emission end faces of the optical fibers 31 also function as pinholes that allow, in the detection lights DL irradiated on the measurement object W via the optical member 21, detection light having a wavelength reflected while focusing on the measurement object W to pass.

The control device 4 is a processing unit that controls projected and received lights and calculates displacement of the measurement object W on the basis of a plurality of reflected lights respectively corresponding to the plurality of irradiation spots. The control device 4 is configured by a light source for light projection 41, couplers 42, a spectroscope 43, a measurement control section 44, and a memory 45. The light source for light projection 41 is a light source device that generates light having a plurality of wavelengths, for example, white light as the detection light DL.

The coupler 42 is a directive coupler that outputs light input from the light source for light projection 41 toward the head unit 2 and, on the other hand, outputs the detection lights DL input from the head unit 2 toward the spectroscope 43. The coupler 42 is a Y coupler, from one end of which two optical fibers 421 and 422 extend and from the other end of which one optical fiber 423 extends. Light emitted from the light source for light projection 41 is input to an incident end of the optical fiber 421. The detection lights DL are emitted from an emission end of the optical fiber 422 toward the spectroscope 43. Four couplers 42 are provided to correspond to the four optical fibers 31.

The spectroscope 43 respectively spectrally disperses the plurality of detection lights DL respectively passed through the emission end faces of the plurality of optical fibers 31 and generates light reception waveforms representing light reception intensities for each wavelength. The spectroscope 43 respectively receives the plurality of detection lights DL and generates a plurality of light reception waveforms. The measurement control section 44 calculates displacement of the measurement object W on the basis of the plurality of light reception waveforms and outputs the displacement to a not-shown display device or external device as a measurement value. Measurement conditions and various kinds of correction information are retained in the memory 45.

Note that an X coupler may be used as the coupler 42. In the X coupler, reflection by an end face is easily prevented compared with the Y coupler. Such an optical fiber coupler is a fusion-type coupler to which a plurality of optical fibers are fused. However, the optical fiber coupler may be a coupler of a type that divides light using a beam splitter.

Head Unit 2

Figure 2:
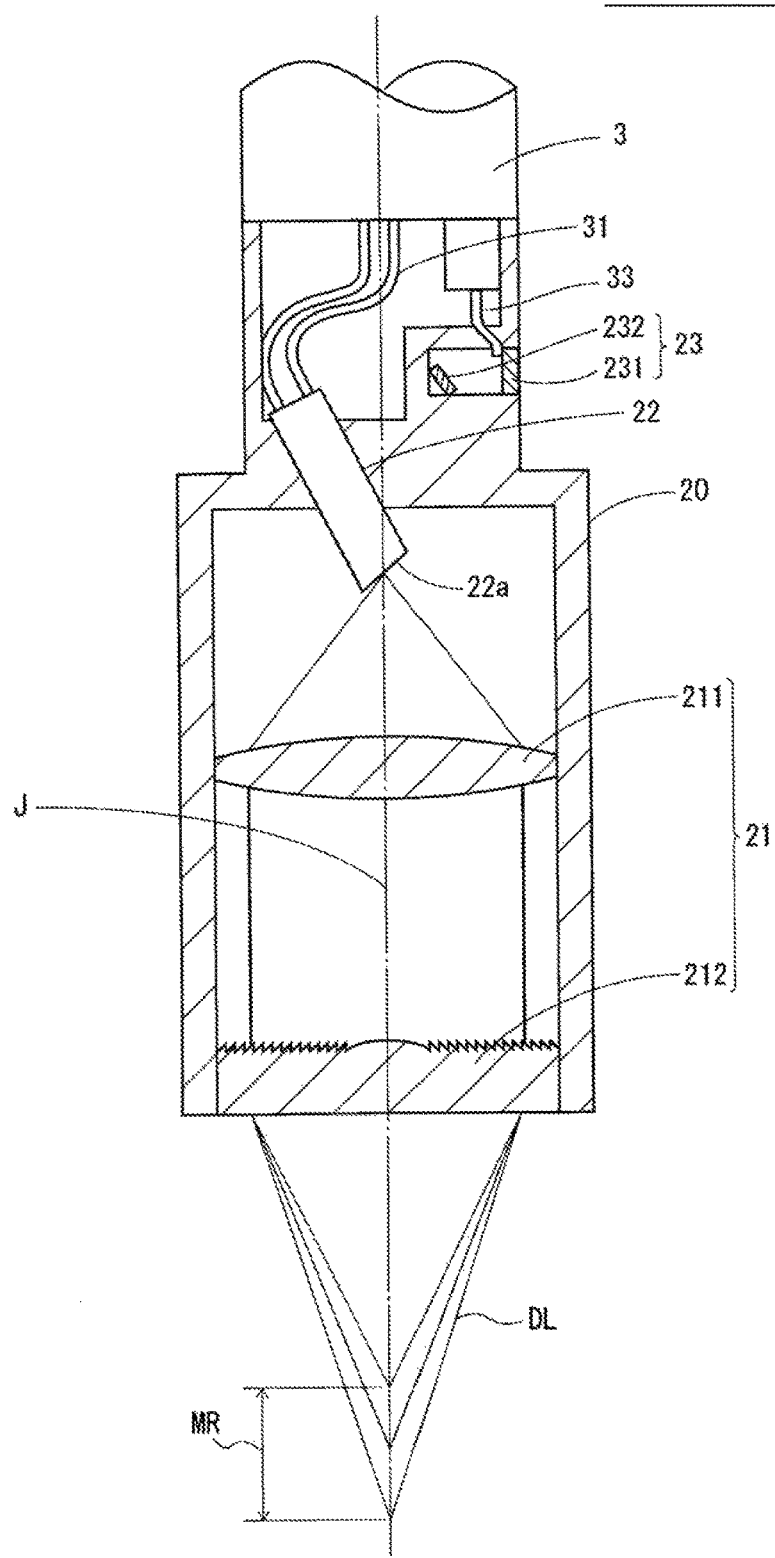
FIG. 2 is a sectional view schematically showing a configuration example of a head unit shown in FIG. 1.
Figure 3:
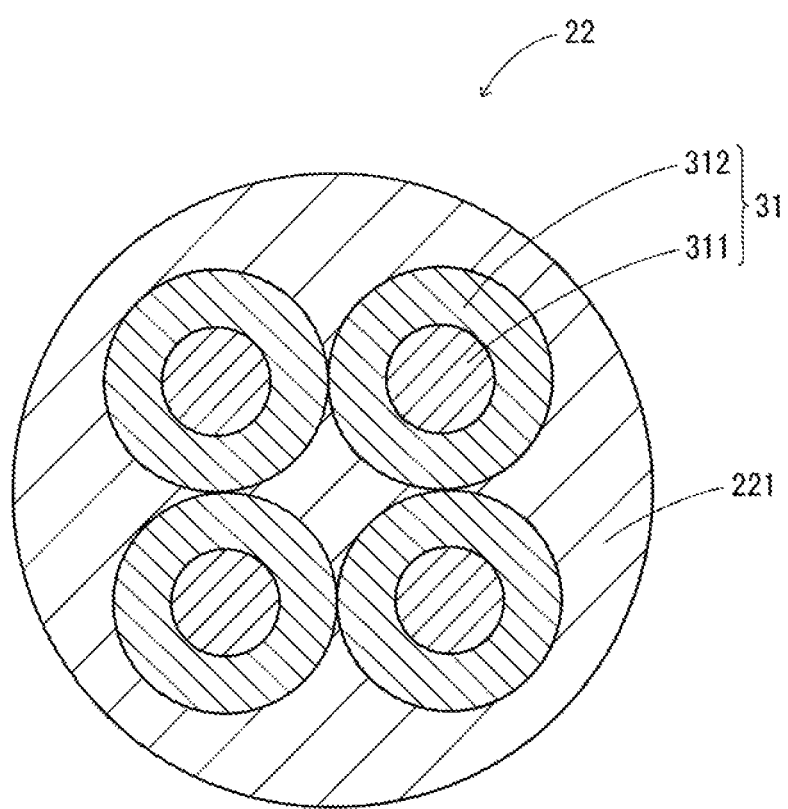
FIG. 3 is a sectional view showing an optical fiber ferrule shown in FIG. 2.

FIG. 2 is a sectional view schematically showing a configuration example of the head unit 2 shown in FIG. 1. A cut surface of the head unit 2 cut along a plane including an optical axis J is shown. FIG. 3 is a sectional view showing an optical fiber ferrule 22 shown in FIG. 2. A cut surface of the optical fiber ferrule 22 cut along a plane perpendicular to a center axis is shown.

The head unit 2 is configured by a housing 20, the optical member 21, the optical fiber ferrule 22, and a display section 23. The housing 20 is, for example, a lens barrel having a covered cylindrical shape. The center axis of the housing 20 is the optical axis J. The optical member 21 is configured by the refraction lens 211 and the diffraction lens 212.

The refraction lens 211 is an optical lens that condenses or diffuses incident light making use of a light refraction phenomenon. The diffraction lens 212 is an optical lens that condenses or diffuses incident light making use of a light diffraction phenomenon. The diffraction lens 212 is disposed to be exposed from a lower end opening of the housing 20.

The diffraction lens 212 is a relief-type diffraction lens. A fine relief (undulation) is formed on an incident surface of the detection lights DL (the upper surface of the diffraction lens 212). The depth in the optical axis direction of the relief is approximately a wavelength of light. A plurality of annular patterns centering on the optical axis J are disposed in the relief. Note that both of the refraction lens 211 and the diffraction lens 212 are single lenses. However, the refraction lens 211 and the diffraction lens 212 may be respectively doublet lenses each obtained by combining a plurality of optical lenses. The optical member 21 may include only one of the refraction lens 211 or the diffraction lens 212. The optical member 21 desirably includes a lens element having a low Abbe number like the diffraction lens 212.

The optical fiber ferrule 22 is a holding member that holds the plurality of optical fibers 31 configuring the fiber cable 3. Emission ends of the optical fibers 31 are bound by a resin member 221. The optical fiber ferrule 22 is disposed to be projected to the lower side from a top lid section of the housing 20.

The optical fibers 31 are configured by cores 311 and clads 312. End faces of the cores 311 function as pinholes. That is, the end faces of the cores 311 of the optical fibers 31 have a sufficiently small diameter compared with a space in which the emission ends of the optical fibers 31 are disposed. The end faces of the cores 311 of the optical fibers 31 can selectively allow light made incident via the optical member 21 to pass. The refraction lens 211 is disposed between the optical fiber ferrule 22 and the diffraction lens 212. The emission end faces of the optical fibers 31 and the optical member 21 configure a confocal optical system.

The confocal optical system stops down received light making use of a confocal principle and causes an axial chromatic aberration in the detection light DL. Therefore, the detection light DL emitted via the emission end face of the optical fiber 31 and transmitted through the optical member 21 focuses on a different position in the up-down direction according to a wavelength. Among wavelength components included in the detection light DL, a specific wavelength component focusing on the measurement object W is reflected by the measurement object W. Reflected light of the specific wavelength component is transmitted through the optical member 21 and focuses on the emission end face of the optical fiber 31. On the other hand, reflected light corresponding to wavelength components other than the specific wavelength component is blocked without focusing on the emission end face of the optical fiber 31.

In the confocal displacement sensor 1, in order to prevent measurement accuracy from being deteriorated by the influence of light reflected on the emission end face of the optical fiber 31, an emission end face 22a of the optical fiber ferrule 22 is obliquely machined. That is, the emission end face 22a is formed as an inclined surface inclined with respect to a plane perpendicular to the center axis of the optical fiber ferrule 22. The inclination of the emission end face 22a is formed by, for example, polishing. The optical fiber ferrule 22 is disposed with the center axis thereof inclined with respect to the optical axis J considering refraction that occurs when the detection light DL passes through the emission end face of the optical fiber 31.

The distance from the head unit 2 to the measurement object W is, for example, approximately 10 mm to 70 mm. The measurement range MR is approximately 1 mm to 20 mm. The measurement range MR corresponds to a band width of the detection light DL. In order to secure a wide measurement range MR, the detection light DL in a wide band is used. The detection light DL includes, for example, a wavelength component of 500 nm to 700 nm.

The display section 23 is provided near a connecting section of the head unit 2 and the fiber cable 3. The display section 23 displays various kinds of information using light for display transmitted from a light source for display in the control device 4 via an optical fiber 33. The display section 23 is provided on the outer circumferential surface of the housing 20 and configured by an emission end of the optical fiber 33, a diffusion window 231, and a reflection member 232. The reflection member 232 is an optical member for reflecting, toward the diffusion window 231, display light emitted via an emission end face of the optical fiber 33. The diffusion window 231 is formed of an optical member that diffuses the display light. The diffusion window 231 is exposed from the outer circumferential surface of the housing 20.

The display of the display section 23 is controlled using an operation state of the control device 4, a light reception waveform, or a measurement value of displacement. Occurrence of a system error during driving, whether the measurement object W is present within a measurement range, and whether the measurement value of the displacement is within a range of a tolerance are displayed. For example, an operation failure such as a communication failure is displayed as the system error. A state (High) in which the measurement value of the displacement is larger than an upper limit threshold, a state (Low) in which the measurement value of the displacement is smaller than a lower limit threshold, and a state (go) in which the measurement value of the displacement is equal to or larger than the lower limit threshold and equal to or smaller than the upper limit threshold are identifiably displayed. Whether the head unit 2 is appropriately set is displayed on the display section 23.

The fiber cable 3 is configured by the optical fiber 31 for measurement and the optical fiber 33 for display. The connector 32 that detachably connects one end of the fiber cable 3 extending from the head unit 2 and a connection port provided in a housing of the control device 4 is a connection member common to both the optical fibers 31 and 33. For example, the optical fibers 31 and 33 are respectively inserted through a plurality of fiber holding holes.

Light Source for Light Projection 41

Figure 4:
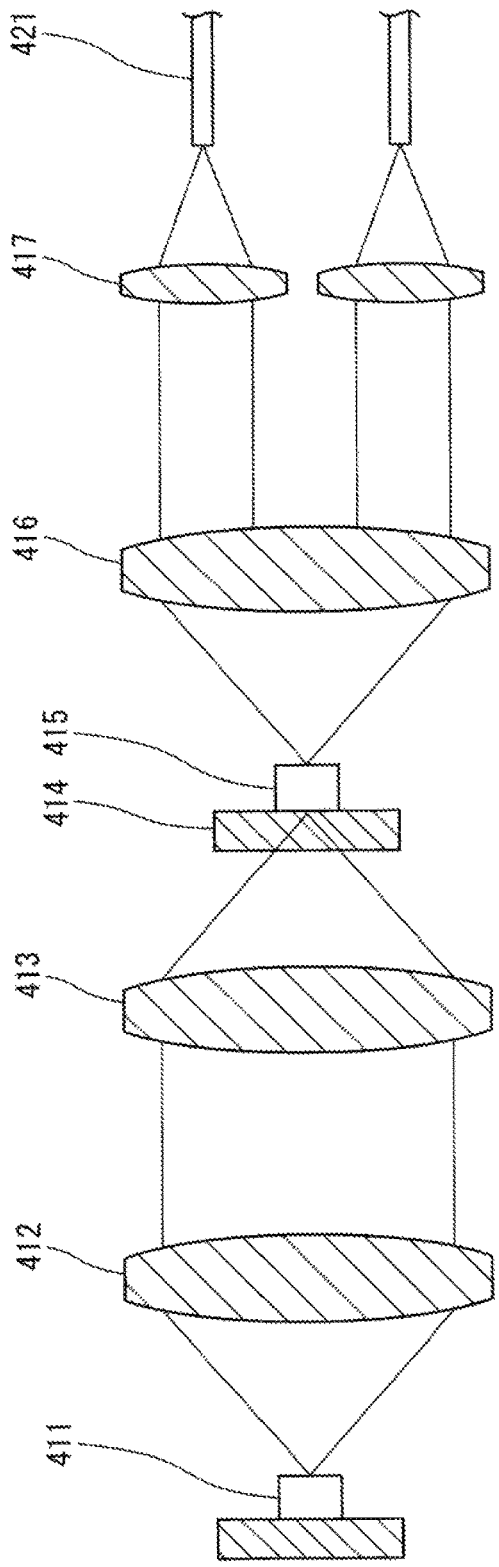
FIG. 4 is a sectional view schematically showing a configuration example of a light source for light projection shown in FIG. 1.

FIG. 4 is a sectional view schematically showing a configuration example of the light source for light projection 41 shown in FIG. 1. The light source for light projection 41 is a light source device that irradiates laser light on a phosphor and causes the phosphor to generate white light. The light source for light projection 41 is configured by an LD (laser diode) 411, optical lenses 412 and 413, a filter element 414, a phosphor 415, a collimator lens 416, and imaging lenses 417.

The LD 411 is a semiconductor light emitting element that generates laser light. The laser light is condensed on the phosphor 415 via the optical lenses 412 and 413 and excites the phosphor 415. The laser light is, for example, blue light or ultraviolet light having a wavelength of 450 nm or less. The phosphor 415 is excited by the laser light emitted from the LD 411 and generates fluorescent light having a wavelength different from the wavelength of the laser light, for example, yellow fluorescent light. More desirably, a plurality of kinds of phosphors are mixed in order to obtain light in a wide band.

The filter element 414 is a flat optical member that transmits the laser light emitted from the LD 411 and reflects light emitted from the phosphor 415. White light obtained by mixing the laser light transmitted through the filter element 414 and the phosphor 415 and the fluorescent light emitted from the phosphor 415 is emitted toward the collimator lens 416.

The collimator lens 416 is an optical lens for obtaining parallel light. The white light transmitted through the collimator lens 416 is divided into lights for each of the couplers 42 by a plurality of imaging lenses 417. The lights are respectively made incident on the incident ends of the optical fibers 421.

The collimator lens 416 has an NA (numerical aperture) larger than a double of an NA of the optical fibers 421 in order to input lights equivalent to the NA to the optical fibers 421. An achromatic lens is used as at least one of the collimator lens 416 and the imaging lenses 417 in order to reduce a chromatic aberration.

Note that, as the light source for light projection 41, a light source that generates light in a wide band, for example, a halogen lamp, an SC light source that generates supercontinuum (SC) light, or a super-luminescent diode (SLD) may be used. The light source for light projection 41 may be a normal white LED. The SC light source generates laser light in a continuous and wide band with a nonlinear optical effect by a pulse laser.

Spectroscope 43

Figure 5:
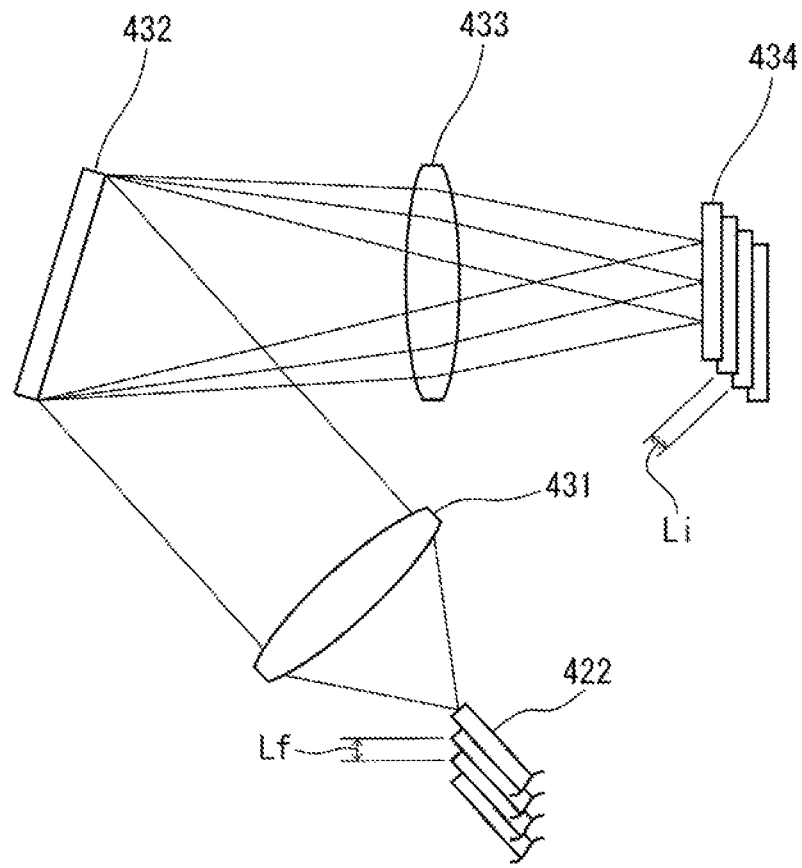
FIG. 5 is an explanatory diagram schematically showing a configuration example of a spectroscope shown in FIG. 1.

FIG. 5 is an explanatory diagram schematically showing a configuration example of the spectroscope 43 shown in FIG. 1. The spectroscope 43 of a reflection type is shown. The spectroscope 43 is configured by a collimator lens 431, a diffraction grating 432, an imaging lens 433, and a plurality of image sensors 434. The spectroscope 43 respectively spectrally disperses the detection lights DL emitted from the emission ends of the optical fibers 422 of the couplers 42.

The emission ends of four optical fibers 422 are arrayed in a direction perpendicular to a paper surface, that is, the up-down direction, whereby the detection lights DL emitted from the emission ends are spectrally dispersed by common optical members (the collimator lens 431, the diffraction grating 432, and the imaging lens 433). The emission ends of the four optical fibers 422 are fixed using, for example, a part or an entire multicore ferrule.

The collimator lens 431 is an optical lens for obtaining parallel light. The collimator lens 431 is disposed to be opposed to emission end faces of the optical fibers 422. The diffraction grating 432 is a color dispersing element of a reflection type that reflects the detection lights DL at a different angle according to a wavelength. The diffraction grating 432 is formed in a flat shape. The imaging lens 433 focuses the plurality of detection lights DL spectrally dispersed by the diffraction grating 432 respectively on the plurality of image sensors 434. Note that both of the collimator lens 431 and the imaging lens 433 are single lenses. However, the collimator lens 431 and the imaging lens 433 may be doublet lenses each obtained by combining a plurality of optical lenses.

The image sensor 434 is, for example, a one-dimensional line image sensor. A large number of light receiving elements are linearly arrayed on the image sensor 434. Light reception waveforms are formed by light reception signals of the light receiving elements. Four image sensors 434 respectively corresponding to the four optical fibers 422 are arrayed in a direction perpendicular the paper surface in a state in which the directions of light receiving surfaces are matched. By using such image sensors 434, it is possible to simultaneously acquire four light reception waveforms corresponding to four irradiation spots. An imaging element in which four independent image sensors 434 are formed as one package is used.

When the plurality of detection lights DL are spectrally dispersed by the common diffraction grating 432, it is necessary to dispose the detection lights DL in a direction crossing a spectral surface including a different plurality of reflection angles according to a wavelength. Therefore, both of the emission ends of the four optical fibers 422 and the four image sensors 434 are arrayed in a direction crossing the spectral surface.

Note that an imaging element on which a large number of light receiving elements are two-dimensionally arrayed may be used as the image sensor 434. A two-dimensional imaging element may be functionally divided. Each of the divided two-dimensional imaging elements may be used as a line image sensor.

In order to prevent light made incident on the image sensor 434 from being regularly reflected on a light receiving surface, reflected by the diffraction grating 432, and received again, the diffraction grating 432 is disposed to be slightly tilted from a state in which the diffraction grating 432 is right opposed to the light receiving surface of the image sensors 434. Note that the detection lights DL may be spectrally dispersed using a prism.

A ratio of a pitch Lf among the optical fibers 422 and a pitch Li among the image sensors 434 needs to coincide with a ratio of a focal length fc of the collimator lens 431 and a focal length fi of the imaging lens 433. That is, the ratios need to satisfy a relational expression Li/Lf=fi/fc.

In the spectroscope 43, in order to absorb dimension errors of the collimator lens 431, the imaging lens 433, the pitch Li, and the like, relative-pitch adjusting means for rotating the emission ends of the optical fibers 422 around the optical axis with respect to the multicore ferrule that holds the emission ends of the optical fibers 422 is provided. With the relative pitch adjusting means, it is possible to adjust the distance among the emission ends of the optical fibers 422 with respect to a disposition interval of the image sensors 434.

Measurement Control Section 44

Figure 6:
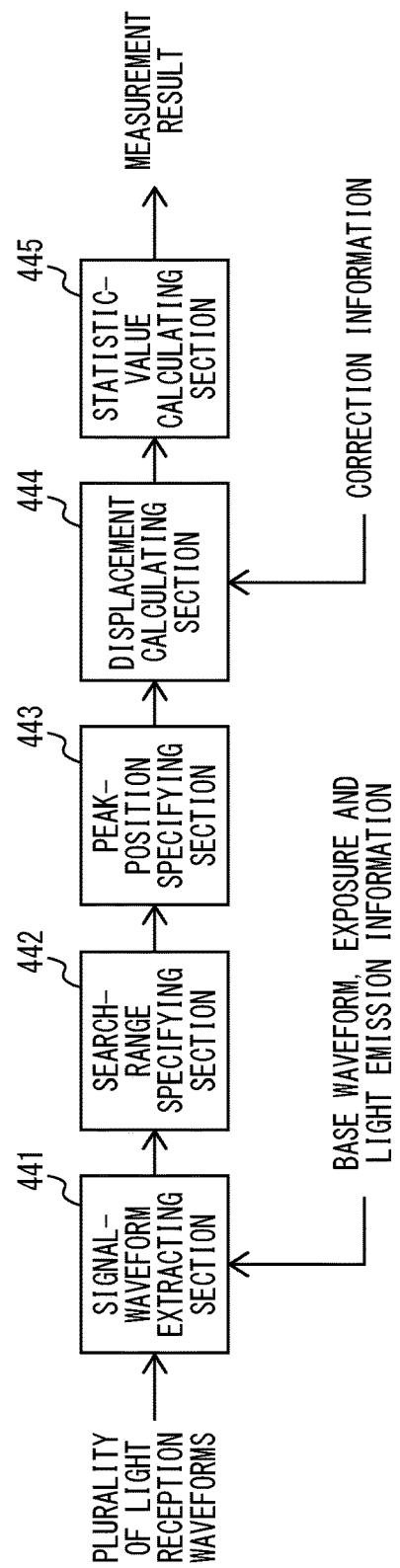
FIG. 6 is a block diagram showing an example of a functional configuration in a measurement control section shown in FIG. 1.

FIG. 6 is a block diagram showing an example of a functional configuration in the measurement control section 44 shown in FIG. 1. The measurement control section 44 is configured by a signal-waveform extracting section 441, a search-range specifying section 442, a peak-position specifying section 443, a displacement calculating section 444, and a statistic-value calculating section 445.

The signal-waveform extracting section 441 acquires a plurality of light reception waveforms from the spectroscope 43 and extracts signal waveforms from the light reception waveforms. In the image sensor 434, a large number of light receiving elements are linearly arrayed. Therefore, light reception intensity data indicating light reception amounts for each of the light receiving elements is managed in association with positions in an array direction. If the positions in the array direction of the light receiving elements are referred to as pixel positions, the light reception waveforms includes a large number of light reception intensity data each associated with the pixel positions.

In order to prevent measurement accuracy from being deteriorated by the influence of return light reflected by a member other than the measurement object, processing for removing a base waveform from a light reception waveform is performed. A signal waveform is obtained by removing the base waveform from the light reception waveform. The base waveform is a waveform corresponding to the detection lights DL not emitted from the optical member 21 of the head unit 2. For example, a reference waveform is calculated considering an exposure condition and a light projection condition with respect to a registered waveform registered in advance. The base waveform is calculated as a correction waveform from the reference waveform.

In order to prevent fluctuation in a measurement value due to noise of the image sensors 434, the search-range specifying section 442 generates an integrated waveform obtained by superimposing a plurality of light reception waveforms and specifies a search range for searching for a peak position on the basis of the integrated waveform. The search-range specifying section 442 generates the integrated waveform by adding up a plurality of signal waveforms acquired for each of the image sensors 434. The search range is specified as, for example, a range of a pixel position where an integrated value of light reception intensity exceeds a predetermined threshold. By specifying the peak position using such a search range, it is possible to improve measurement accuracy for the measurement object W having low reflectance.

The peak-position specifying section 443 fits, concerning a plurality of light reception waveforms, a curve in a data point row in the search range for each of the light reception waveforms and specifies the peak position. The peak-position specifying section 443 fits, concerning a plurality of signal waveforms acquired for each of the image sensors 434, a predetermined curve in a data point row in the search range for each of the signal waveforms and specifies the peak position as a pixel position of a largest point on the curve. The fitting of the curve is performed by a regression operation.

The displacement calculating section 444 calculates displacement of the measurement object W on the basis of peak positions respectively specified concerning the plurality of light reception waveforms and outputs the displacement to the statistic-value calculating section 445 as a measurement value. The statistic-value calculating section 445 calculates displacement of the measurement object W according to predetermined statistical processing and outputs the displacement as a measurement result.

For example, the statistic-value calculating section 445 performs the statistical processing of a plurality of light reception waveforms and generates a representative light reception waveform from the plurality of light reception waveforms. A displacement amount is calculated from a peak position of the representative light reception waveform. In the statistical processing, concerning the plurality of light reception waveforms, maximum, minimums, or averages of peak intensities and peak positions are calculated or representative values are calculated by excluding outliers.

The statistic-value calculating section 445 respectively calculates displacements of the measurement object W on the basis of the plurality of light reception waveforms, performs the statistical processing of the displacements, and generates representative displacement. Specifically, processing for respectively calculating displacement amounts concerning a plurality of peak positions corresponding to the plurality of signal waveforms and calculating an average of the displacement amounts or processing for excluding outliners from the plurality of peak positions and calculating an average of the displacement amounts is performed as the statistical processing. Processing for weighting a plurality of displacement amounts according to light reception intensities corresponding to the displacement amounts and calculating a weighted average is performed as the statistical processing. Weight is decided according to, for example, peak intensity of a signal waveform or width of the signal waveform. By performing these kinds of statistical processing, it is possible to improve measurement accuracy of displacement.

Correction information for correcting linearity in converting a peak position into displacement is retained in the memory 45. The displacement calculating section 444 performs correction of the linearity for each of the image sensors 434 using the correction information and calculates displacement.

In order to realize a wide dynamic range, the measurement control section 44 differentiates an exposure amount for each of the image sensors 434 to acquire a plurality of light reception waveforms and calculates displacement of the measurement object W on the basis of the acquired plurality of light reception waveforms. Adjustment of the exposure amount is performed by, for example, changing an exposure time of the image sensor 434 or changing a gain in amplifying a light reception signal.

By adopting such a configuration, even if there is an irradiation spot having excessive exposure or insufficient exposure, displacement is calculated from light reception waveforms corresponding to other irradiation spots. Therefore, it is possible to obtain a wide dynamic range. Even if the reflectance of the measurement object W greatly fluctuates, it is possible to output measurement values without interruption.

Further, in thickness measurement of a transparent body such as glass, when reflectance is greatly different between the front surface and the rear surface, it is possible to calculate thickness using a light reception waveform acquired in an exposure time optimized for the front surface and a light reception waveform acquired in an exposure time optimized for the rear surface. That is, it is possible to accurately measure thickness by performing sampling once or a small number of times.

Figure 7:
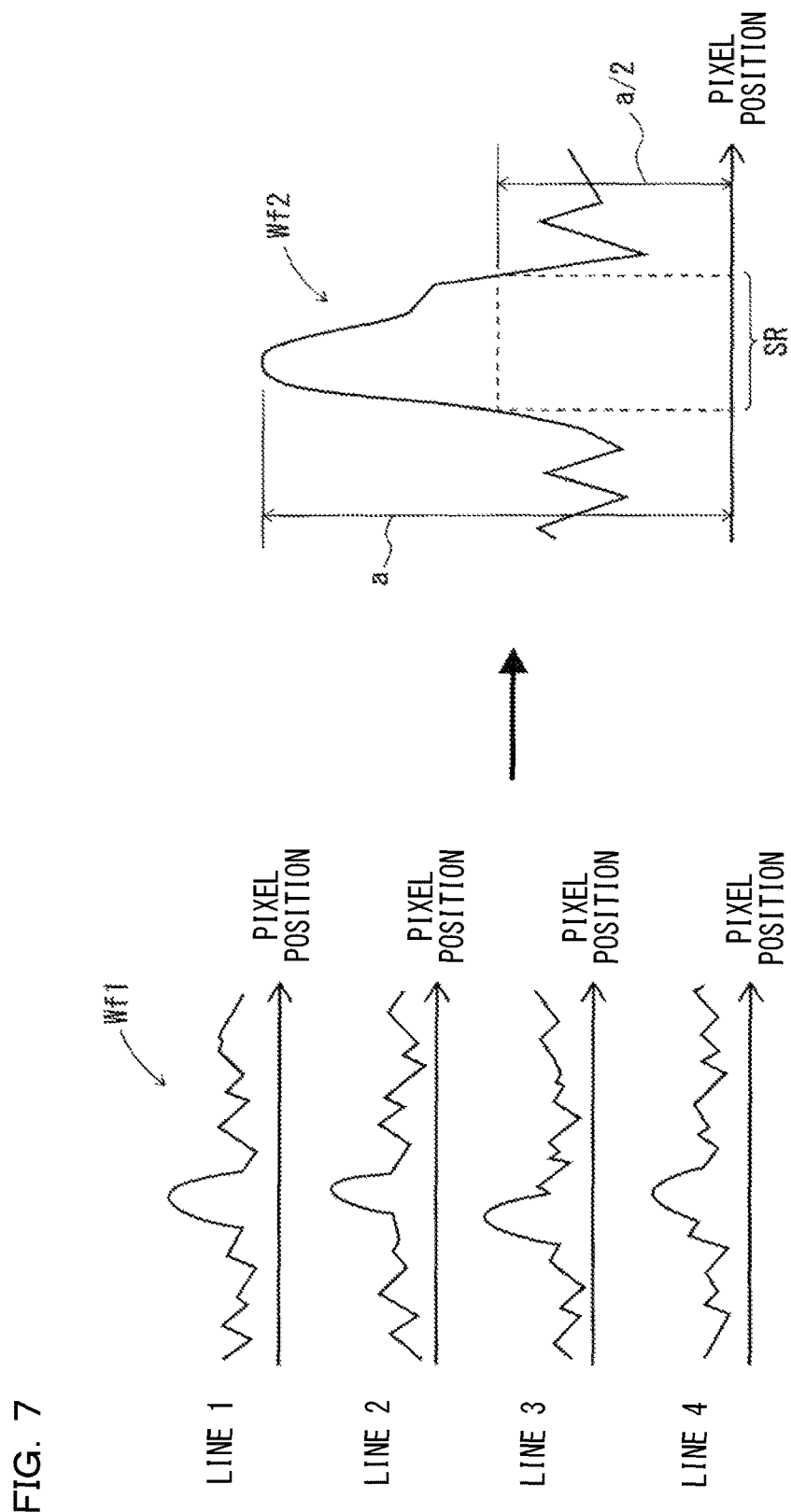
FIG. 7 is a diagram showing an example of the operation of the measurement control section shown in FIG. 6 and showing a state in which the measurement control section calculates an integrated waveform from a plurality of signal waveforms and specifies a search range.

FIG. 7 is a diagram showing an example of the operation of the measurement control section 44 shown in FIG. 6 and showing a state in which the measurement control section 44 calculates an integrated waveform Wf2 from a plurality of signal waveforms Wf1 and specifies a search range SR. When outputs of the four image sensors 434 are referred to as lines 1 to 4 and distinguished, the signal waveforms Wf1 are acquired for each of the lines. Noise components of the image sensors 434 are included in the signal waveforms Wf1. Therefore, when a peak position of light reception intensity is specified and a displacement amount is calculated, the displacement amount fluctuates because of the influence of the noise components.

The integrated waveform Wf2 is obtained by superimposing the signal waveforms Wf1 concerning the lines 1 to 4. Compared with the original signal waveforms Wf1, an SN ratio is improved by approximately two folds. Stationary resolution can be improved. Therefore, it is possible to prevent misdetection of a peak and perform stable measurement. The search range SR in searching for a peak position concerning the signal waveforms Wf1 is decided on the basis of the integrated waveform Wf2. The search range SR is decided as, for example, a half value width of peak intensity "a".

Figure 8:
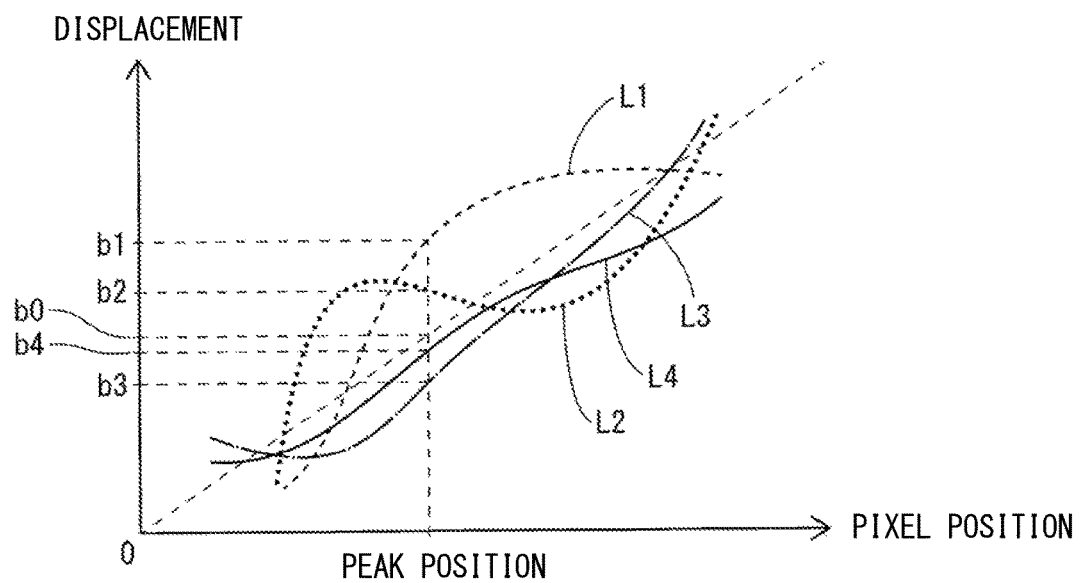
FIG. 8 is a diagram showing an example of the operation of the measurement control section shown in FIG. 6 and showing correction curves L1 to L4 for correcting linearity.

FIG. 8 is a diagram showing an example of the operation of the measurement control section 44 shown in FIG. 6 and showing correction curves L1 to L4 for correcting linearity. The correction curves L1 to L4 are curves representing a conversion characteristic in converting a pixel position into displacement. Deviation from an ideal straight line is shown for each of lines.

In a method of optically combining a plurality of detection lights DL and spectrally dispersing combined lights of the plurality of detection lights DL to obtain one light reception waveform, linearity is not correctly corrected because the linearity is different for each of irradiation spots. For example, when the reflectance of the surface of the measurement object is greatly different depending on the positions of the irradiation spots, a correction amount is determined by the influence of an irradiation spot having high reflectance. Therefore, the linearity deviates. In the example shown in FIG. 8, the absolute value of a correction amount (b1–b0) of the correction curve L1 in a peak position is large compared with correction amounts (b2–b0), (b3–b0), and (b4–b0) of the other correction curves L2 to L4. The linearity is not correctly corrected even if the linearity is corrected with a correction amount corresponding to a specific irradiation spot.

In the confocal displacement sensor 1, the correction of the linearity is performed and a displacement amount is calculated for each of the image sensors 434. Therefore, even in the measurement object W, the reflectance of the surface of which is greatly different depending on a measurement part, it is possible to correctly correct the linearity.

Figure 9:
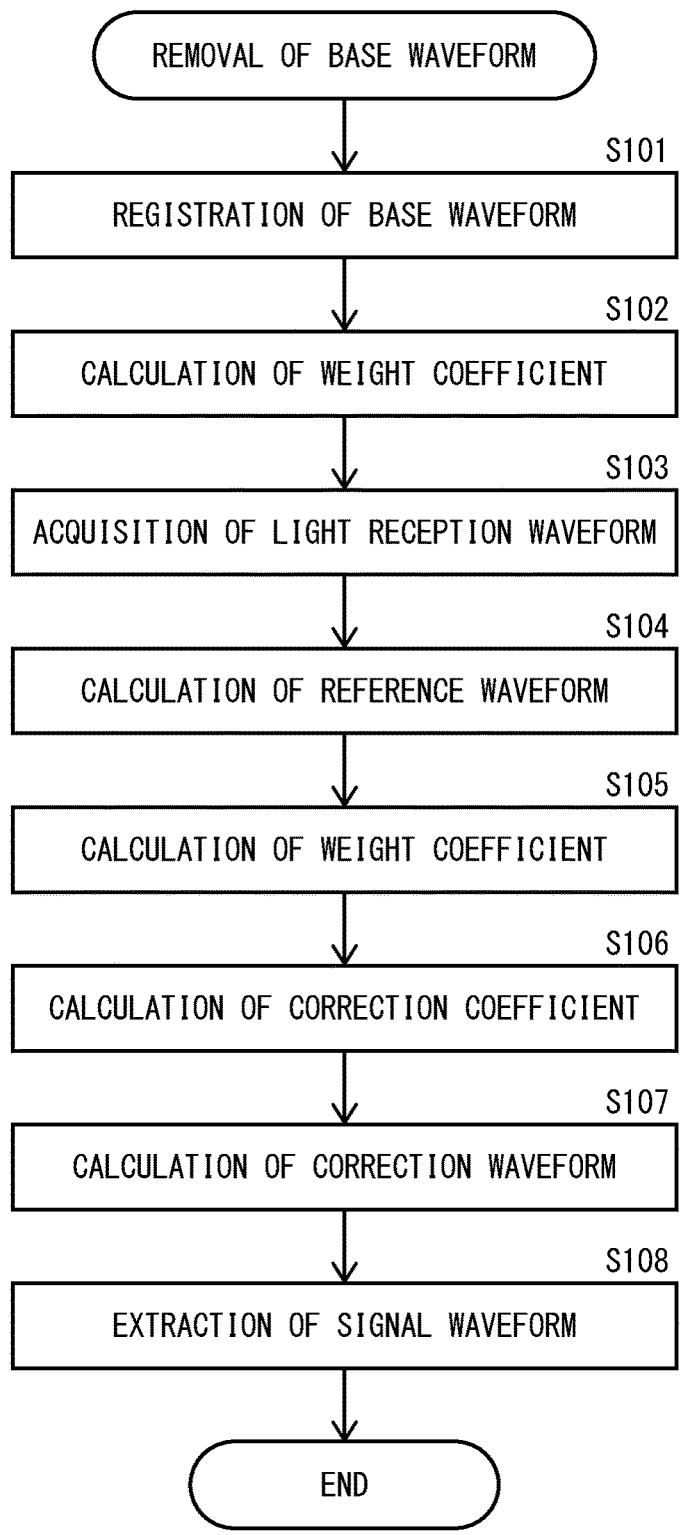
FIG. 9 is a flowchart showing an example of removal processing for a base waveform in the measurement control section shown in FIG. 6.
Figure 10A:
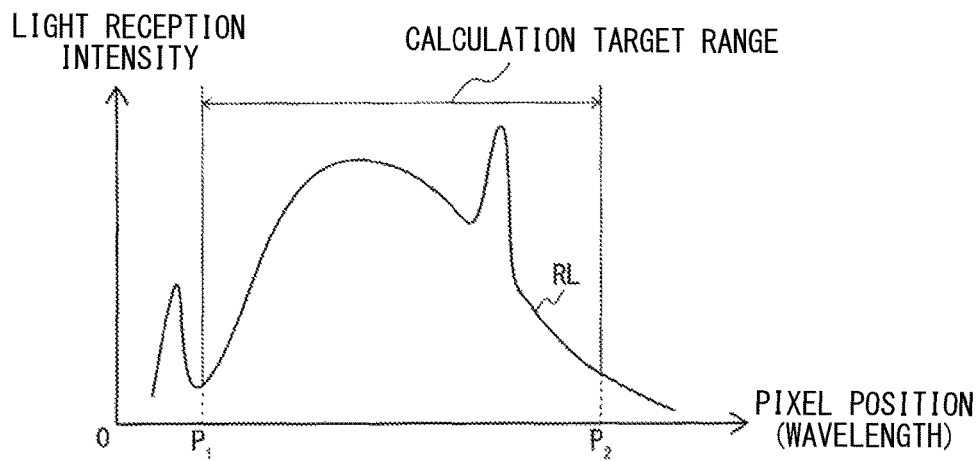
FIGS. 10A to 10C are diagrams showing an example of the operation of the measurement control section shown in FIG. 6 and showing states from removal of a correction waveform from a light reception waveform until obtaining of a signal waveform.
Figure 10B:
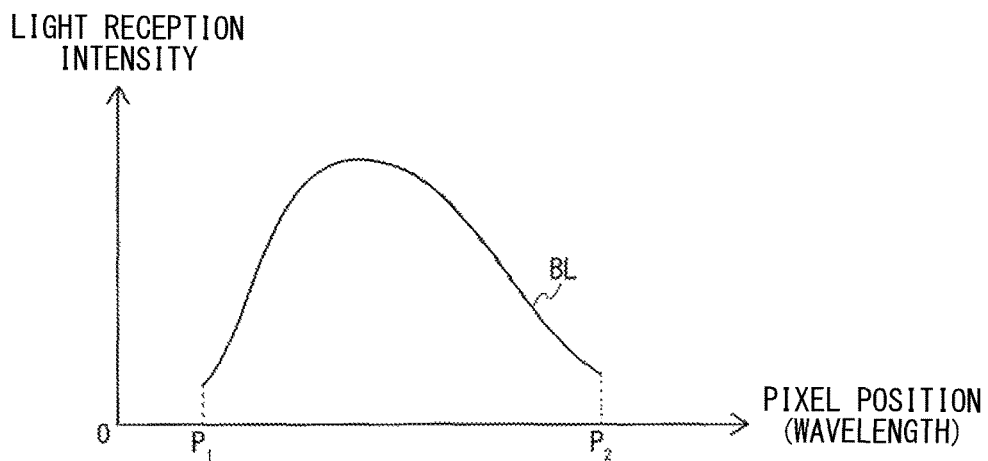
Figure 10C:
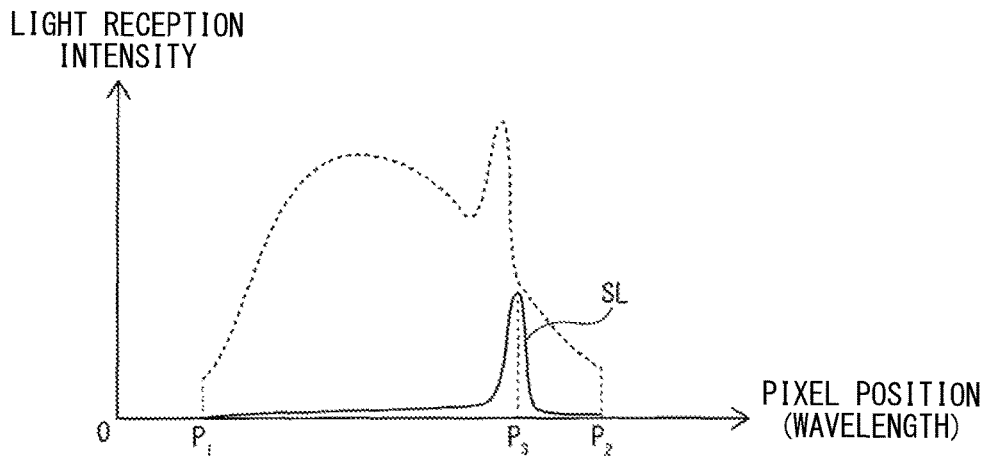

FIG. 9 is a flowchart showing an example of removal processing for a base waveform in the measurement control section 44 shown in FIG. 6. FIGS. 10A to 10C are diagrams showing an example of the operation of the measurement control section 44 shown in FIG. 6 and showing states from removal of the correction waveform BL from a light reception waveform RL until obtaining of the signal waveform SL. The light reception waveform RL is shown in FIG. 10A. The base waveform BL is shown in FIG. 10B. The signal waveform SL is shown in FIG. 10C. The light reception waveform RL, the base waveform BL, and the signal waveform SL are respectively drawn with a pixel position plotted on the horizontal axis and light reception intensity plotted on the vertical axis.

First, the measurement control section 44 registers the base waveform BL as a registered waveform (step S101) and calculates a weight coefficient W1 on the basis of the registered waveform (step S102). The weight coefficient W1 is calculated by, for example, a product-sum operation of two registered waveforms.

Subsequently, the measurement control section 44 acquires the light reception waveform RL (step S103) and calculates a reference waveform on the basis of the registered waveform and an exposure and light emission state during the light reception waveform RL acquisition (step S104). The measurement control section 44 calculates a weight coefficient W2 on the basis of the light reception waveform RL and the registered waveform (step S105). The weigh coefficient W2 is calculated by, for example, a product-sum operation of the light reception waveform RL and the registered waveform.

Subsequently, the measurement control section 44 calculates a correction coefficient from the weight coefficients W1 and W2 (step S106) and multiplies the reference waveform by the correction coefficient to calculate a correction waveform (step S107). The measurement control section 44 subtracts the correction waveform from the light reception waveform RL to thereby extract a signal waveform (step S108).

In the light reception waveform RL, sharp peaks are formed on a short wavelength side and a long wavelength side. One peak where light reception intensity gently changes is formed between the peaks. A peak waveform on the short wavelength side is a light reception waveform corresponding to laser light for phosphor excitation. A peak waveform on the long wavelength side corresponds to the signal waveform SL. The peak waveform on the short wavelength side and the gently changing peak waveform correspond to the base waveform BL. When a light having a large light amount, for example, light obtained by using a laser is used as a light source, the intensity of the base waveform BL increases.

In order to remove the influence of the peak waveform on the short wavelength side, a pixel position $P_1$ is decided in advance further on the long wavelength side than the peak wavelength. A pixel position $P_2$ is decided in advance in order to remove the influence on the long wavelength side. The signal waveform SL is a light reception waveform corresponding to reflected light from the measurement object W. The signal waveform SL is calculated by subtracting the base waveform BL from the light reception waveform RL.

When a laser light source is used as the light source for light projection 41 and mixed light of laser light of the laser light source and fluorescent light emitted from the phosphor 415 excited by the laser light is used as the detection light DL, a light amount of the detection light DL is extremely large. Therefore, the influence of reflected light by a member other than the measurement object W cannot be neglected. A light reception waveform corresponding to the reflected light by the member other than the measurement object W is the base waveform BL. In the light reception waveform RL, a peak position $P_3$ of the signal waveform SL deviates because of the presence of the base waveform BL.

By extracting the signal waveform SL from the light reception waveform RL and specifying the peak position $P_3$, it is possible to correctly specify a peak position without being affected by a return light reflected by the member other than the measurement object W.

According to this embodiment, displacement is calculated using the four light reception waveforms corresponding to the four irradiation spots. Therefore, it is possible to prevent the influence of irregular reflection due to local unevenness of the surface of the measurement object W. Therefore, it is possible to prevent a measurement value from greatly fluctuating depending on a measurement part. In particular, it is possible to prevent the measurement value from fluctuating exceeding a degree of surface roughness of a rough surface body. Further, it is possible to prevent fluctuation in the measurement value with respect to positional deviation of the confocal displacement sensor 1.

Second Embodiment

In the first embodiment, the example is explained in which the four couplers 42 are provided to correspond to the four irradiation spots and the four detection lights DL reflected by the measurement object W are respectively independently spectrally dispersed. On the other hand, in a second embodiment, two couplers respectively combine two detection lights DL reflected by the measurement object W and output combined lights to the spectroscope 43.

Figure 11:
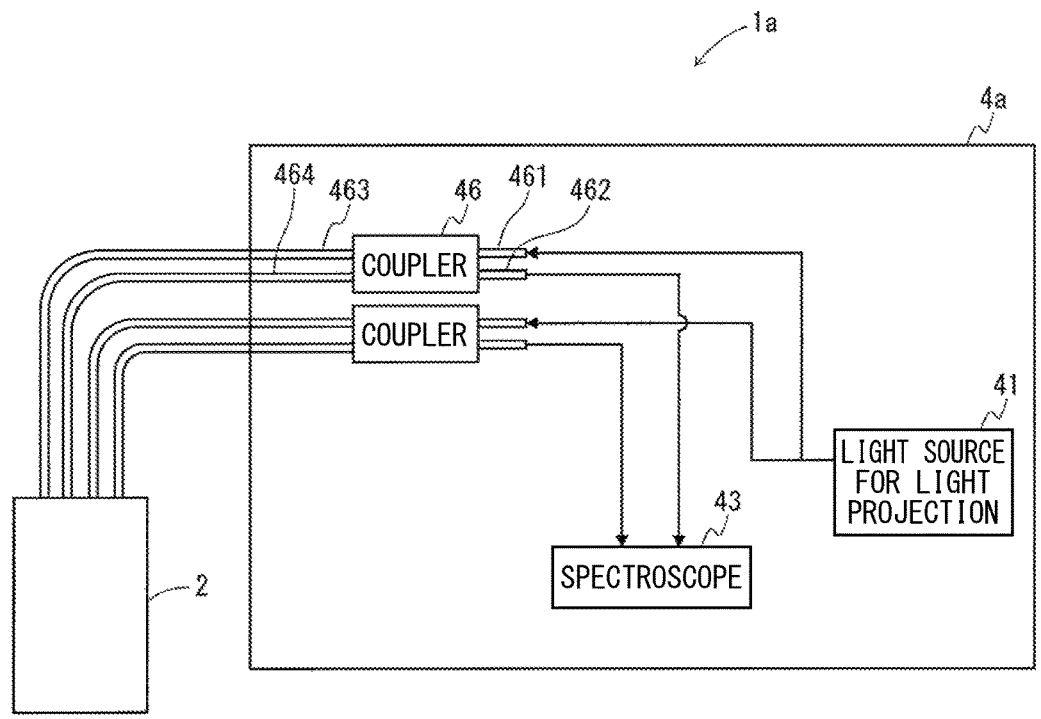
FIG. 11 is a system diagram showing a configuration example of a confocal displacement sensor according to a second embodiment of the present invention.

FIG. 11 is a system diagram showing a configuration example of a confocal displacement sensor 1a according to the second embodiment of the present invention. In this figure, the measurement control section 44 and the memory 45 are omitted. The confocal displacement sensor 1a is different from the confocal displacement sensor 1 shown in FIG. 1 in that a control device 4a includes two couplers 46.

The coupler 46 is an X coupler, from one end of which two optical fibers 461 and 462 extend and from the other end of which two optical fibers 463 and 464 extend. The coupler 46 is an optical combination section that optically combines two detection lights DL respectively passed through emission end faces (pinholes) of two optical fibers 31 to generate combined light. Light of the light source for light projection 41 is input to an incident end of the optical fiber 461. The light is respectively output toward the head unit 2 from emission ends of the optical fibers 463 and 464. On the other hand, the two detection lights DL reflected by the measurement object W and transmitted via the head unit 2 and the fiber cable 3 are respectively input to the emission ends of optical fibers 463 and 464. Combined light of the two detection lights DL is emitted toward the spectroscope 43 from an emission end of the optical fiber 462.

The spectroscope 43 respectively spectrally disperses two combined lights to generate two light reception waveforms. In the spectroscope 43, two image sensors 434 respectively corresponding to two optical fibers 462 are provided. The optical fiber ferrule 22 in the head unit 2 is disposed such that positions in the optical axis direction of the emission ends of the two optical fibers 31 connected to the common coupler 46 coincide with each other. With such a configuration, it is possible to simplify the configuration of the spectroscope 43.

Figure 12:
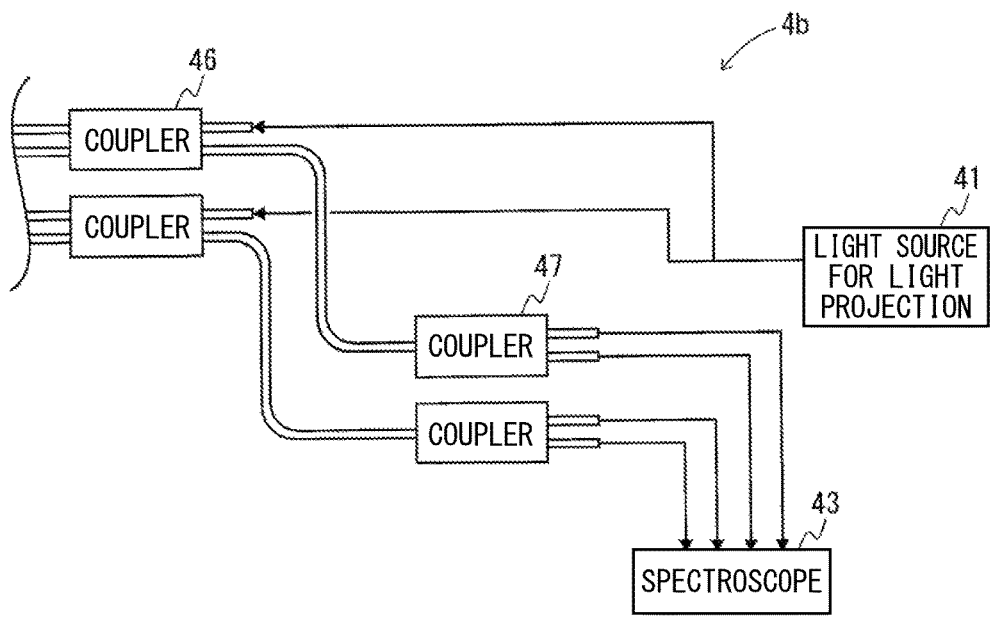
FIG. 12 is a system diagram showing another configuration example of the confocal displacement sensor.

FIG. 12 is a system diagram showing another configuration example of the confocal displacement sensor 1a and showing a control device 4b that divides combined light by the coupler 46 into two with the coupler 47. In this figure, the head unit 2, the measurement control section 44, and the memory 45 are omitted. The control device 4b is different from the control device 4a shown in FIG. 11 in that the control device 4b includes two couplers 47.

The coupler 47 is a Y coupler, from one end of which two optical fibers extend and from the other end of which one optical fiber extends. Combined light output from the coupler 46 is input to the optical fiber at the other end. Divided lights of the combined light are respectively emitted from the two optical fibers at one end toward the spectroscope 43. With such a configuration as well, it is possible to prevent a measurement value from fluctuating exceeding a degree of surface roughness.

Third Embodiment

In the first and second embodiments, the example is explained in which the end faces of the plurality of optical fibers 31 that transmit lights between the head unit 2 and the control device 4 are respectively caused to function as the pinholes of the confocal optical system. On the other hand, in a third embodiment, light emitted from a light source for light projection is guided to a pinhole without using an optical fiber, reflected by the measurement object W, and detection light passed through the pinhole is guided to the spectroscope 43.

Figure 13:
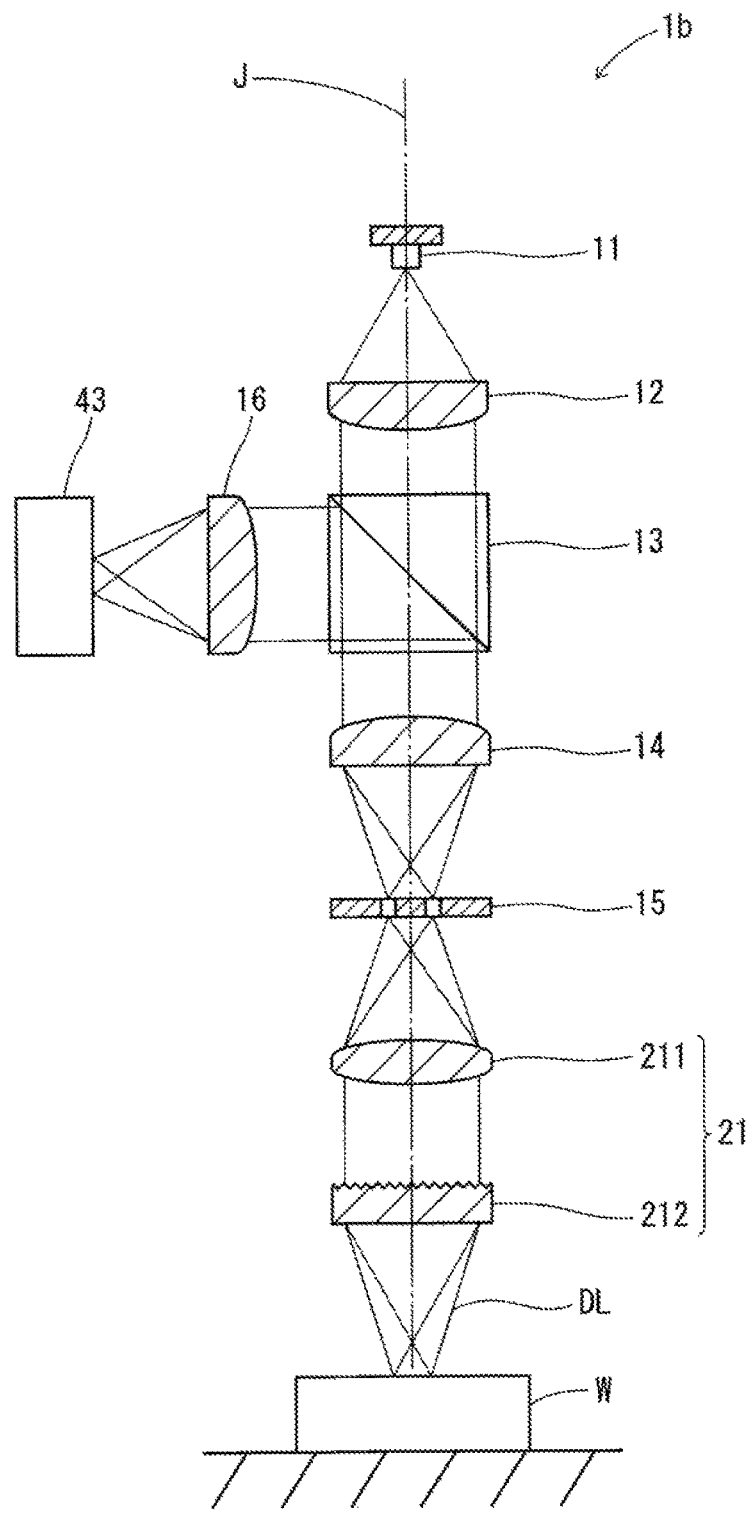
FIG. 13 is a system diagram showing a configuration example of a confocal displacement sensor according to a third embodiment of the present invention.

FIG. 13 is a system diagram showing a configuration example of a confocal displacement sensor 1b according to the third embodiment of the present invention. In this figure, the measurement control section 44 and the memory 45 are omitted. The confocal displacement sensor 1b is configured by a light source for light projection 11, condensing lenses 12 and 14, a beam splitter 13, a pinhole member 15, the optical member 21, a lens for spectroscope 16, and the spectroscope 43.

The condensing lenses 12 and 14 are optical lenses that condense light emitted from the light source for light projection 11 in two pinholes of the pinhole member 15. The pinhole member 15 is a flat light blocking member including very small pinholes (openings). The light emitted from the light source for light projection 11 passes through the pinholes, whereby the pinhole member 15 emits two detection lights DL.

The optical member 21 causes an axial chromatic aberration in the two detection lights DL respectively emitted from the two pinholes of the pinhole member 15 and converges the two detection lights DL toward the measurement object W. The pinhole member 15 and the optical member 21 configure a confocal optical system.

The beam splitter 13 is an optical member that transmits the light emitted from the light source for light projection 11 and, on the other hand, reflects the detection lights DL reflected by the measurement object W and passed through the optical member 21 and the pinhole member 15 toward the spectroscope 43. The beam splitter 13 is disposed between the condensing lens 12 and the condensing lens 14.

The two detection lights DL reflected by the beam splitter 13 are respectively made incident on the spectroscope 43 via the lens for spectroscope 16. In the confocal displacement sensor 1b, two irradiation spots are formed on the measurement object W to correspond to the two pinholes. Displacement is calculated using two light reception waveforms corresponding to the irradiation spots. Therefore, the influence of irregular reflection due to local unevenness of the surface of the measurement object W is averaged. It is possible to prevent a measurement value from greatly fluctuating depending on a measurement part.

Note that, in the first to third embodiments, the example is explained in which laser light is irradiated on the phosphor 415 to generate white light for light projection and the white light is made incident on the incident end of the optical fiber 421 using the collimator lens 416 and the imaging lens 417. However, the present invention does not limit the configuration of the light source for light projection to this. For example, the light source for light projection may be configured to make the white light directly incident on the incident end of the optical fiber 421 using an LED (light emitting diode) that generates white light.

Figure 14:
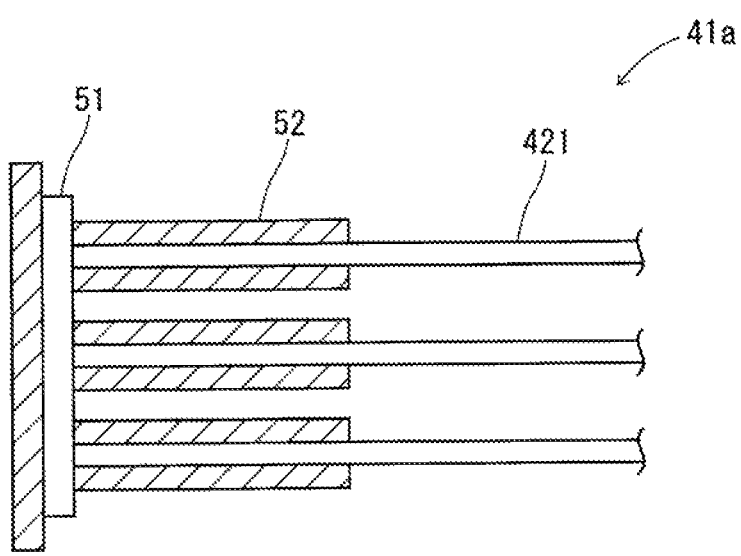
FIG. 14 is a sectional view showing another configuration example of the confocal displacement sensor according to the first embodiment and showing a light source for light projection.

FIG. 14 is a sectional view showing another configuration example of the confocal displacement sensor 1 and showing a light source for light projection 41a disposed such that incident end faces of optical fiber ferrules 52 are opposed to a light emitting surface of an LED 51. The optical fiber ferrules 52 are holding members that hold the incident ends of the optical fibers 421. Three optical fiber ferrules 52 corresponding to the three optical fibers 421 are disposed on the light emitting surface of the LED 51.

Figure 15:
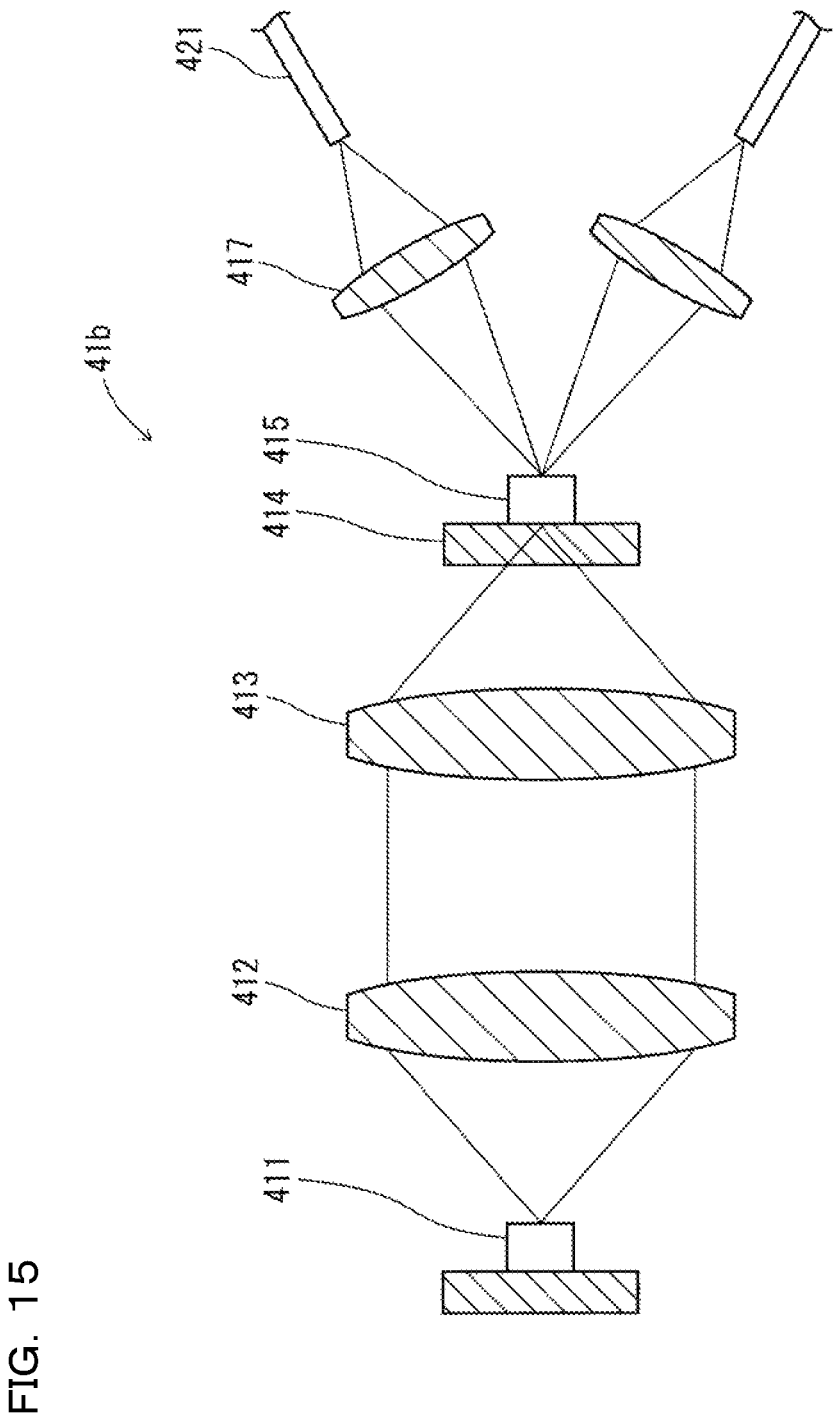
FIG. 15 is a sectional view showing still another configuration example of the confocal displacement sensor and showing a light source for light projection.

FIG. 15 is a sectional view showing another configuration example of the confocal displacement sensor 1 and showing a light source for light projection 41b that makes white light emitted from the phosphor 415 incident on the incident ends of the optical fibers 421 without using the collimator lens 416. The light source for light projection 41b is different from the light source for light projection 41 shown in FIG. 4 in that the light source for light projection 41b does not include the collimator lens 416.

White light obtained by mixing laser light transmitted through the filter element 414 and the phosphor 415 and fluorescent light emitted from the phosphor 415 is emitted toward the plurality of imaging lenses 417. The white light transmitted through the imaging lenses 417 is made incident on the incident ends of the optical fibers 421.

Figure 16:
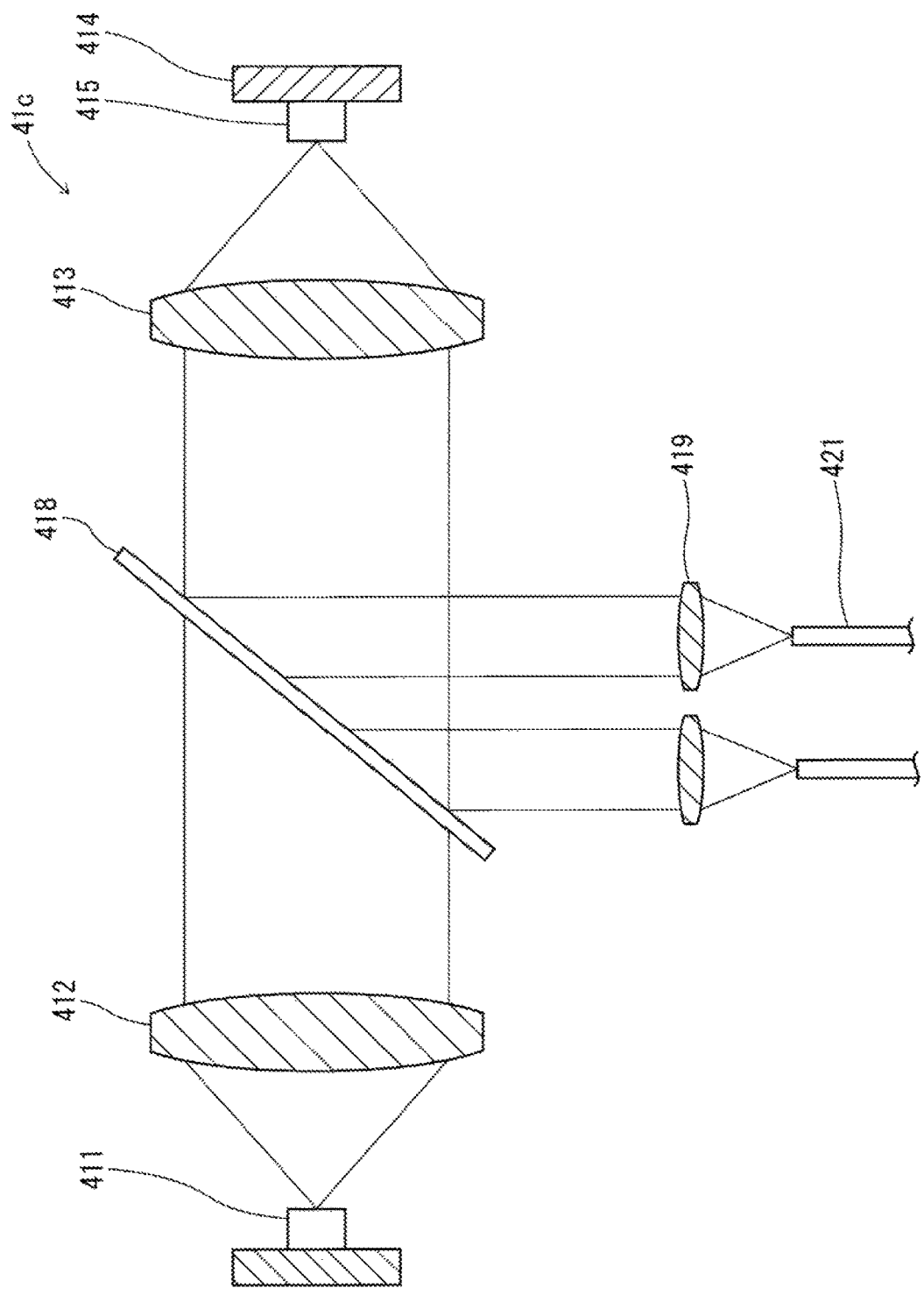
FIG. 16 is a sectional view showing still another configuration example of the confocal displacement sensor and showing a light source for light projection.

FIG. 16 is a sectional view showing another configuration example of the confocal displacement sensor 1 and showing a light source for light projection 41c that reflects white light emitted from the phosphor 415 with a beam splitter 418 and makes the white light incident on the incident ends of the optical fibers 421. A light source for light projection 41c is configured by the LD 411, the optical lenses 412 and 413, the filter element 414, the phosphor 415, the beam splitter 418, and imaging lenses 419.

The beam splitter 418 is an optical member that transmits laser light emitted from the LD 411 and, on the other hand, reflects white light obtained by mixing laser light reflected by the filter element 414 and fluorescent light emitted from the phosphor 415 toward a plurality of imaging lenses 419. The beam splitter 418 is disposed between the optical lens 412 and the optical lens 413. The white light transmitted through the imaging lens 419 is made incident on the incident ends of the optical fibers 421.

Figure 17A:
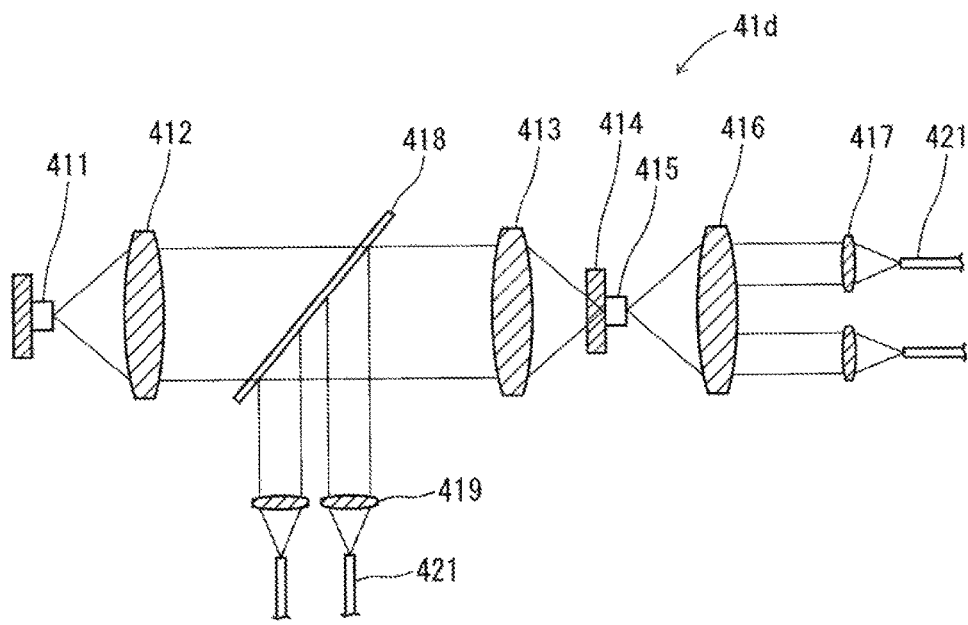
FIGS. 17A and 17B are sectional views showing other configuration examples of the confocal displacement sensor and showing light sources for light projection.
Figure 17B:
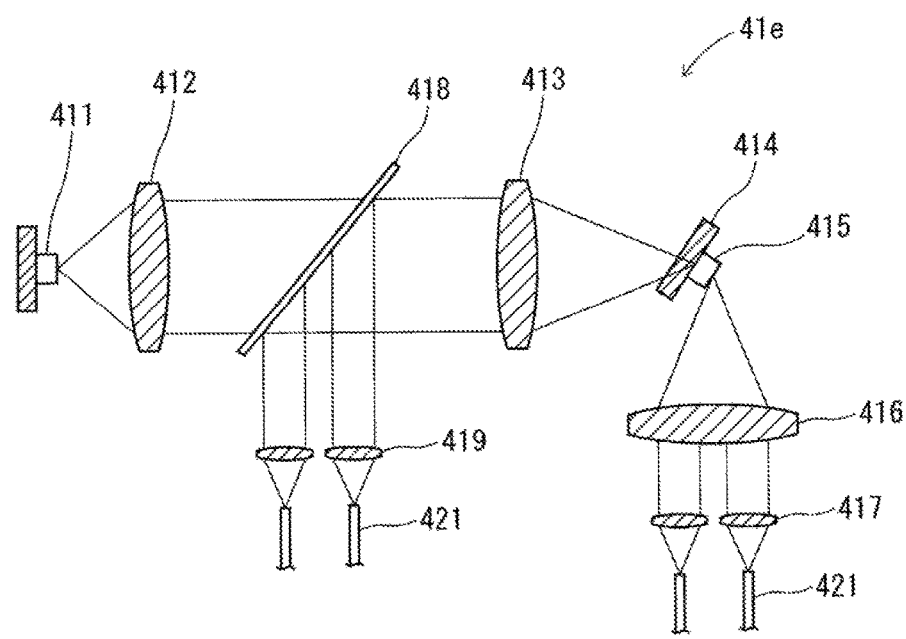

FIGS. 17A and 17B are sectional views showing other configuration examples of the confocal displacement sensor 1. FIG. 17A shows a light source for light projection 41d that makes white light transmitted through the filter element 414 and the phosphor 415 and white light reflected by the phosphor 415 respectively incident on the incident ends of the optical fibers 421. The light source for light projection 41d is different from the light source for light projection 41 shown in FIG. 4 in that the light source for light projection 41d includes the beam splitter 418 and the imaging lenses 419.

FIG. 17B shows a light source for light projection 41e that makes white light refracted by the phosphor 415 and white light reflected by the phosphor 415 respectively incident on the incident ends of the optical fibers 421. The light source for light projection 41e is different from the light source for light projection 41d shown in FIG. 17A in the disposition of the filter element 414, the phosphor 415, the collimator lens 416, and the imaging lenses 417. The filter element 414 and the phosphor 415 are disposed to be inclined with respect to the optical axis of the LD 411 and the optical lenses 412 and 413.

In the first to third embodiments, the example of the spectroscope 43 of the reflection type is explained. However, the present invention does not limit the configuration of the spectroscope to this. For example, a spectroscope of a transmission type that spectrally disperses incident light into a different wavelength component according to a transmission angle may be used.

Figure 18:
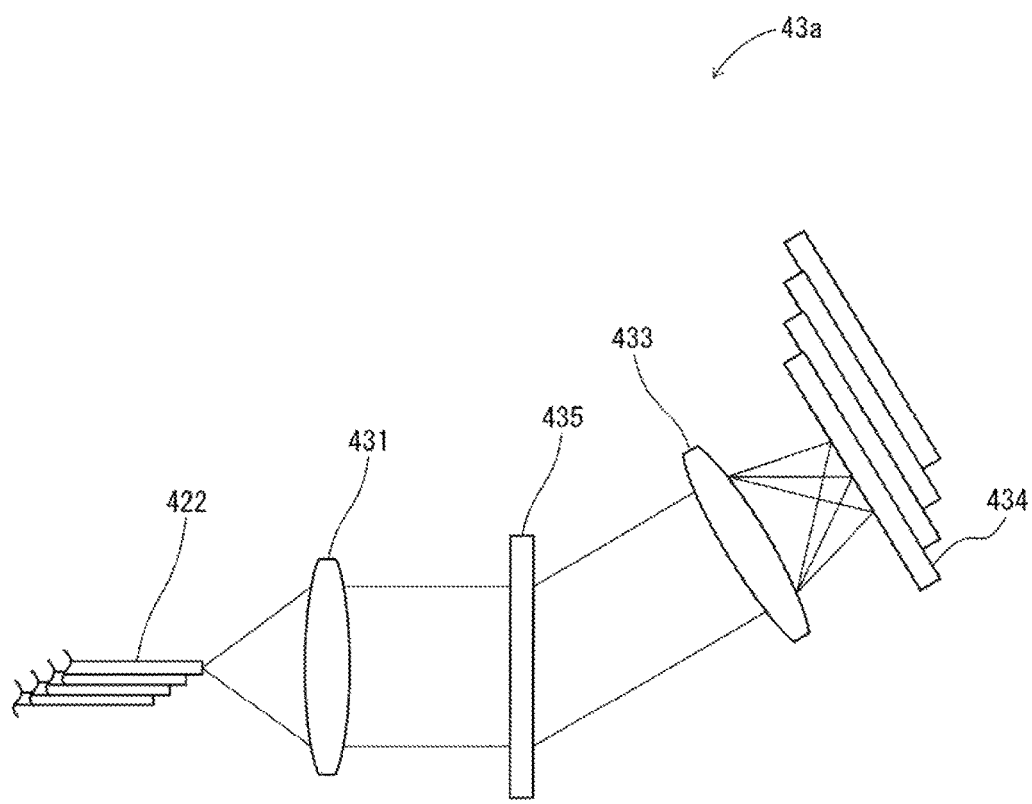
FIG. 18 is an explanatory diagram schematically showing still another configuration example of the confocal displacement sensor and showing a spectroscope of a transmission type.

FIG. 18 is an explanatory diagram schematically showing another configuration example of the confocal displacement sensor 1 and showing a spectroscope 43a of the transmission type. The spectroscope 43a is different from the spectroscope 43 shown in FIG. 5 in that a diffraction grating 435 is the transmission type. The diffraction grating 435 spectrally disperses incident light into a different wavelength component according to a transmission angle.

In the first to third embodiments, the example is explained in which the confocal optical system of the head unit 2 forms four irradiation spots on the measurement object W. However, the present invention does not limit the configuration of the confocal optical system to this. For example, the confocal optical system may be configured to include two, three, or five or more pinholes and form two, three, or five or more irradiation spots on the measurement object W.

What is claimed is:

1. A confocal displacement sensor that measures displacement of a measurement object using a confocal optical system, the confocal displacement sensor comprising:

a light source for light projection configured to generate light having a plurality of wavelengths;

a plurality of pinholes configured to respectively emit a plurality of detection lights by allowing light emitted from the light source for light projection to pass;

an optical member configured to cause an axial chromatic aberration in the plurality of detection lights respectively emitted via the plurality of pinholes and converge the plurality of detection lights toward the measurement object;

a spectroscope configured to respectively spectrally disperse, in the detection lights irradiated on the measurement object via the optical member, a plurality of detection lights respectively passed through the plurality of pinholes by being reflected while focusing on the measurement object and generate a plurality of light reception waveforms representing light reception intensities for each wavelength; and a measurement control section configured to statistically process the plurality of light reception waveforms and generate a representative light reception waveform from the plurality of light reception waveforms.

2. The confocal displacement sensor according to claim 1, wherein the measurement control section respectively specifies peak positions concerning the plurality of light reception waveforms.

3. The confocal displacement sensor according to claim 2, wherein the measurement control section specifies a search range on the basis of an integrated waveform obtained by superimposing the plurality of light reception waveforms and fits, concerning the plurality of light reception waveforms, a curve in a data point row in the search range for each of the light reception waveforms to specify the peak position.

4. The confocal displacement sensor according to claim 2, further comprising a correction-information storing section configured to retain correction information for correcting linearity in converting the peak position into displacement, wherein
the spectroscope includes a plurality of image sensors corresponding to the plurality of pinholes,
the image sensors receive detection lights after spectral dispersion and generate the light reception waveforms, and
the measurement control section performs the correction of the linearity for each of the image sensors using the correction information to calculate displacement.

5. The confocal displacement sensor according to claim 2, further comprising a base-waveform storing section configured to retain a base waveform corresponding to detection light not emitted from the optical member, wherein
the spectroscope includes a plurality of image sensors corresponding to the plurality of pinholes,
the image sensors receive detection lights after spectral dispersion and generate the light reception waveforms, and
the measurement control section extracts a signal waveform from the light reception waveforms for each of the image sensors on the basis of the base waveform and specifies the peak position.

6. The confocal displacement sensor according to claim 1, wherein
the spectroscope includes a plurality of image sensors corresponding to the plurality of pinholes,
the image sensors receive detection lights after spectral dispersion and generate the light reception waveforms, and
the measurement control section calculates displacement of the measurement object on the basis of a plurality of light reception waveforms acquired by differentiating an exposure amount for each of the image sensors.

7. The confocal displacement sensor according to claim 1, further comprising an optical combination section configured to optically combine a part of a plurality of detection lights respectively passed through the plurality of pinholes and generate a plurality of combined lights, wherein
the spectroscope respectively spectrally disperses the plurality of combined lights and generates a plurality of light reception waveforms.

8. The confocal displacement sensor according to claim 1, wherein
the spectroscope includes a plurality of image sensors which are linearly arrayed corresponding to the plurality of pinholes,
the image sensors receive detection lights after spectral dispersion and generate the light reception waveforms, and
the measurement control section generates the representative light reception waveform based on the light reception waveforms.

9. A confocal displacement sensor that measures displacement of a measurement object using a confocal optical system,
the confocal displacement sensor comprising:
a light source for light projection configured to generate light having a plurality of wavelengths;
a plurality of pinholes configured to respectively emit a plurality of detection lights by allowing light emitted from the light source for light projection to pass;
an optical member configured to cause an axial chromatic aberration in the plurality of detection lights respectively emitted via the plurality of pinholes and converge the plurality of detection lights toward the measurement object;
a spectroscope configured to respectively spectrally disperse, in the detection lights irradiated on the measurement object via the optical member, a plurality of detection lights respectively passed through the plurality of pinholes by being reflected while focusing on the measurement object and generate a plurality of light reception waveforms representing light reception intensities for each wavelength; and
a measurement control section configured to respectively calculate displacements of the measurement object on the basis of the plurality of light reception waveforms, statistically process the displacements, and generate representative displacement.

10. The confocal displacement sensor according to claim 9, wherein the measurement control section respectively specifies peak positions concerning the plurality of light reception waveforms.

11. The confocal displacement sensor according to claim 10, wherein the measurement control section specifies a search range on the basis of an integrated waveform obtained by superimposing the plurality of light reception waveforms and fits, concerning the plurality of light reception waveforms, a curve in a data point row in the search range for each of the light reception waveforms to specify the peak position.

12. The confocal displacement sensor according to claim 10, further comprising a correction-information storing section configured to retain correction information for correcting linearity in converting the peak position into displacement, wherein
the spectroscope includes a plurality of image sensors corresponding to the plurality of pinholes,
the image sensors receive detection lights after spectral dispersion and generate the light reception waveforms, and
the measurement control section performs the correction of the linearity for each of the image sensors using the correction information to calculate displacement.

13. The confocal displacement sensor according to claim 10, further comprising a base-waveform storing section configured to retain a base waveform corresponding to detection light not emitted from the optical member, wherein
the spectroscope includes a plurality of image sensors corresponding to the plurality of pinholes,
the image sensors receive detection lights after spectral dispersion and generate the light reception waveforms, and
the measurement control section extracts a signal waveform from the light reception waveforms for each of the image sensors on the basis of the base waveform and specifies the peak position.

14. The confocal displacement sensor according to claim 9, wherein
the spectroscope includes a plurality of image sensors corresponding to the plurality of pinholes,
the image sensors receive detection lights after spectral dispersion and generate the light reception waveforms, and
the measurement control section calculates displacement of the measurement object on the basis of a plurality of light reception waveforms acquired by differentiating an exposure amount for each of the image sensors.

15. The confocal displacement sensor according to claim 9, further comprising an optical combination section configured to optically combine a part of a plurality of detection lights respectively passed through the plurality of pinholes and generate a plurality of combined lights, wherein
the spectroscope respectively spectrally disperses the plurality of combined lights and generates a plurality of light reception waveforms.

16. The confocal displacement sensor according to claim 9, wherein
the spectroscope includes a plurality of image sensors which are linearly arrayed corresponding to the plurality of pinholes,
the image sensors receive detection lights after spectral dispersion and generate the light reception waveforms, and
the measurement control section generates the generate representative displacement based on the light reception waveforms.

17. A confocal displacement sensor comprising:
a head unit including a confocal optical system;
a control device including a light source for light projection configured to generate light having a plurality of wavelengths;
a fiber cable including a plurality of optical fibers configured to respectively transmit light emitted from the light source for light projection to the head unit, and
an optical combination section configured to optically combine a part of a plurality of detection lights respectively passed through the plurality of pinholes and generate a plurality of combined lights, wherein
the spectroscope respectively spectrally disperses the plurality of combined lights and generates a plurality of light reception waveforms, and wherein
the head unit includes an optical member configured to cause an axial chromatic aberration in a plurality of detection lights respectively emitted via end faces of the plurality of optical fibers and converge the plurality of detection lights toward a measurement object, and
the control device includes:
a spectroscope configured to respectively spectrally disperse, in the detection lights irradiated on the measurement object via the optical member, a plurality of detection lights respectively passed through the end faces of the plurality of optical fibers by being reflected while focusing on the measurement object and generate a plurality of light reception waveforms representing light reception intensities for each wavelength; and
a measurement control section configured to calculate displacement of the measurement object on the basis of the plurality of light reception waveforms.

18. The confocal displacement sensor according to claim 17, wherein the measurement control section respectively specifies peak positions concerning the plurality of light reception waveforms.

19. The confocal displacement sensor according to claim 17, wherein
the spectroscope includes a plurality of image sensors which are linearly arrayed corresponding to the plurality of pinholes,
the image sensors receive detection lights after spectral dispersion and generate the light reception waveforms, and
the measurement control section calculates the displacement of the measurement object based on the light reception waveforms.

20. The confocal displacement sensor according to claim 17, wherein the optical combination section is provided in the control device.

* * * * *